United States Patent
Snibbe et al.

(10) Patent No.: US 10,002,642 B2
(45) Date of Patent: *Jun. 19, 2018

(54) METHODS AND DEVICES FOR GENERATING MEDIA ITEMS

(71) Applicant: FACEBOOK, INC., Menlo Park, CA (US)

(72) Inventors: Scott Snibbe, San Francisco, CA (US); Graham McDermott, Berkeley, CA (US); Justin Ponczek, San Francisco, CA (US); Spencer Schoeben, Palo Alto, CA (US); Jesse Fulton, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/297,062

(22) Filed: Oct. 18, 2016

(65) Prior Publication Data

US 2017/0040039 A1 Feb. 9, 2017

Related U.S. Application Data

(63) Continuation of application No. 14/608,108, filed on Jan. 28, 2015, now Pat. No. 9,519,644.

(Continued)

(51) Int. Cl.
*G06F 17/30* (2006.01)
*G11B 27/10* (2006.01)
(Continued)

(52) U.S. Cl.
CPC ........ *G11B 27/10* (2013.01); *G06F 17/30026* (2013.01); *G06F 17/30038* (2013.01);
(Continued)

(58) Field of Classification Search
None
See application file for complete search history.

(56) References Cited

U.S. PATENT DOCUMENTS 6,493,872 B1 12/2002 Rangan et al.
8,209,723 B2 6/2012 Sakaguchi et al.
(Continued)

FOREIGN PATENT DOCUMENTS

EP 2575131 4/2013
EP 3100182 12/2016
(Continued)

OTHER PUBLICATIONS

U.S. Appl. No. 14/816,984, "Final Office Action", dated Dec. 8, 2017, 7 pages.
(Continued)

*Primary Examiner* — Belix M Ortiz Ditren
(74) *Attorney, Agent, or Firm* — Kilpatrick Townsend & Stockton LLP

(57) ABSTRACT

The various implementations described herein include methods, devices, and systems for generating media items. In one aspect, a method is performed at a server system. The method includes: (1) receiving one or more audio files; (2) obtaining one or more audio characteristics for the audio files; (3) receiving a request to generate a media item using the audio files, the request including one or more criteria; and (4) in response to receiving the request, generating the media item, including: (a) identifying one or more visual media files based on the criteria and the audio characteristics; and (b) generating synchronization information; (5) storing the media item in the server system; and (6) enabling playback of the media item by sending a link for the stored media item to the client device.

20 Claims, 14 Drawing Sheets

Related U.S. Application Data

(60) Provisional application No. 61/975,651, filed on Apr. 4, 2014.

(51) Int. Cl.
| | | |
|---|---|---|
| *G11B 27/031* | (2006.01) | |
| *H04N 21/233* | (2011.01) | |
| *H04N 21/235* | (2011.01) | |
| *H04N 21/239* | (2011.01) | |
| *H04N 21/8547* | (2011.01) | |
| *H04N 21/858* | (2011.01) | |

(52) U.S. Cl.
CPC .. *G06F 17/30047* (2013.01); *G06F 17/30056* (2013.01); *G06F 17/30174* (2013.01); *G11B 27/031* (2013.01); *H04N 21/233* (2013.01); *H04N 21/235* (2013.01); *H04N 21/2393* (2013.01); *H04N 21/858* (2013.01); *H04N 21/8547* (2013.01)

(56) References Cited

U.S. PATENT DOCUMENTS

| | | | |
|---|---|---|---|
| 8,258,390 | B1 | 9/2012 | Gossweiler et al. |
| 8,594,714 | B2 | 11/2013 | Wu |
| 8,745,500 | B1 | 6/2014 | Kostello et al. |
| 8,806,320 | B1 | 8/2014 | Abdo |
| 8,996,538 | B1* | 3/2015 | Cremer ............ G06F 17/30864 707/749 |
| 9,116,912 | B1 | 8/2015 | Snibbe et al. |
| 9,207,844 | B2 | 12/2015 | Snibbe et al. |
| 9,207,857 | B2 | 12/2015 | Snibbe et al. |
| 9,268,787 | B2 | 2/2016 | Snibbe et al. |
| 9,519,644 | B2 | 12/2016 | Snibbe et al. |
| 2004/0095379 | A1 | 5/2004 | Chang et al. |
| 2004/0096379 | A1 | 5/2004 | Furste et al. |
| 2005/0078947 | A1 | 4/2005 | Chung et al. |
| 2006/0005143 | A1 | 1/2006 | Sakkinen et al. |
| 2006/0064716 | A1 | 3/2006 | Sull et al. |
| 2006/0212478 | A1 | 9/2006 | Plastina et al. |
| 2007/0061724 | A1 | 3/2007 | Slothouber et al. |
| 2007/0188657 | A1 | 8/2007 | Basson et al. |
| 2007/0204003 | A1 | 8/2007 | Abramson |
| 2007/0250896 | A1 | 10/2007 | Parker et al. |
| 2008/0092047 | A1 | 4/2008 | Fealkoff et al. |
| 2008/0136940 | A1 | 6/2008 | Srikanth et al. |
| 2008/0208692 | A1 | 8/2008 | Garaventi et al. |
| 2008/0209482 | A1 | 8/2008 | Meek et al. |
| 2008/0256086 | A1 | 10/2008 | Miyoshi et al. |
| 2008/0274687 | A1 | 11/2008 | Roberts et al. |
| 2009/0100361 | A1 | 4/2009 | Abello et al. |
| 2009/0150797 | A1 | 6/2009 | Burkholder et al. |
| 2009/0271283 | A1 | 10/2009 | Fosnacht et al. |
| 2010/0223128 | A1 | 9/2010 | Dukellis et al. |
| 2010/0223314 | A1 | 9/2010 | Gadel et al. |
| 2011/0066940 | A1 | 3/2011 | Asghari Kamrani et al. |
| 2011/0163969 | A1 | 7/2011 | Anzures et al. |
| 2012/0026397 | A1 | 2/2012 | Gummagatta |
| 2012/0233644 | A1 | 9/2012 | Rao |
| 2012/0254925 | A1 | 10/2012 | Nassiri |
| 2013/0047081 | A1 | 2/2013 | Long et al. |
| 2013/0070093 | A1 | 3/2013 | Rivera et al. |
| 2013/0117692 | A1 | 5/2013 | Padmanabhan et al. |
| 2013/0218942 | A1 | 8/2013 | Willis et al. |
| 2013/0238696 | A1* | 9/2013 | Cotelo ............ G06F 17/30029 709/204 |
| 2013/0273968 | A1 | 10/2013 | Rhoads et al. |
| 2014/0040742 | A1 | 2/2014 | Park et al. |
| 2014/0074712 | A1 | 3/2014 | Palmer et al. |
| 2014/0115469 | A1 | 4/2014 | Pendergast et al. |
| 2014/0237365 | A1 | 8/2014 | Oberbrunner et al. |
| 2015/0066780 | A1 | 3/2015 | Cohen et al. |
| 2015/0067514 | A1 | 3/2015 | Lewis et al. |
| 2015/0067726 | A1 | 3/2015 | Glasser |
| 2015/0220249 | A1 | 8/2015 | Snibbe et al. |
| 2015/0220558 | A1 | 8/2015 | Snibbe et al. |
| 2015/0221339 | A1 | 8/2015 | Snibbe et al. |
| 2015/0234564 | A1 | 8/2015 | Snibbe et al. |
| 2015/0286716 | A1 | 10/2015 | Snibbe et al. |
| 2015/0339295 | A1 | 11/2015 | Snibbe et al. |
| 2015/0341707 | A1 | 11/2015 | Snibbe et al. |
| 2016/0054873 | A1 | 2/2016 | Snibbe et al. |
| 2016/0173960 | A1 | 6/2016 | Snibbe et al. |

FOREIGN PATENT DOCUMENTS

| | | |
|---|---|---|
| EP | 3100268 | 12/2016 |
| WO | 2011066432 | 6/2011 |
| WO | 2015116839 | 8/2015 |
| WO | 2015116841 | 8/2015 |

OTHER PUBLICATIONS

U.S. Appl. No. 14/608,097, First Action Interview Pilot Program Pre-Interview Communication dated Sep. 8, 2015, 5 pages.
U.S. Appl. No. 14/608,097, Notice of Allowance dated Oct. 14, 2015, 11 pages.
U.S. Appl. No. 14/608,099, Non-Final Office Action dated Apr. 20, 2015, 14 pages.
U.S. Appl. No. 14/608,099, Notice of Allowance dated Aug. 6, 2015, 8 pages.
U.S. Appl. No. 14/608,103, Notice of Allowance dated Aug. 11, 2015, 19 pages.
U.S. Appl. No. 14/608,103, Pre-Interview First Office Action dated Apr. 30, 2015, 5 pages.
U.S. Appl. No. 14/608,105, Notice of Allowance dated Mar. 27, 2015, 9 pages.
U.S. Appl. No. 14/608,108, Final Office Action dated Feb. 26, 2016, 11 pages.
U.S. Appl. No. 14/608,108, Final Office Action dated Aug. 14, 2015, 12 pages.
U.S. Appl. No. 14/608,108, Non-Final Office Action dated Nov. 12, 2015, 14 pages.
U.S. Appl. No. 14/608,108, Notice of Allowance dated Jul. 15, 2016, 7 pages.
U.S. Appl. No. 14/608,108, Pre-Interview First Office Action dated Mar. 26, 2015, 5 pages.
U.S. Appl. No. 14/816,984, Non-Final Office Action dated Jun. 15, 2017, 7 pages.
U.S. Appl. No. 14/820,477, Final Office Action dated Feb. 9, 2017, 20 pages.
U.S. Appl. No. 14/820,477, Final Office Action dated Sep. 29, 2017, 22 pages.
U.S. Appl. No. 14/820,477, Non-Final Office Action dated Jun. 17, 2016, 16 pages.
U.S. Appl. No. 14/820,477, Non-Final Office Action dated Apr. 26, 2017, 20 pages.
U.S. Appl. No. 15/051,618, Non-Final Office Action dated Sep. 6, 2017, 18 pages.
Canadian Application No. 2,975,411, Office Action dated Sep. 15, 2017, 7 pages.
Chavanu, Create Your Own Music Video With Video Star, Online Available at: http://web.archive.org/web/20120613172308 /http://www.makeuseof.com/tag/create-your-own-musicvideo-with-video-star/, Jun. 13, 2012, 16 pages.
European Application No. 12820426.0, Supplemental European Search Report dated Feb. 27, 2015, 6 pages.
European Application No. 15705154.1, Communication Pursuant to Rules 161(2) and 162 dated Sep. 20, 2016, 2 pages.
European Application No. 15705155.8, Communication Pursuant to Rules 161(2) and 162 dated Sep. 28, 2016, 2 pages.
Handler, iMovie for iPhone, Online Available at: http://examples.oreilly.com/9781449393656/ iMovie_for_iPhone.pdf, Jan. 24, 2013, pp. 1-34.
International Application No. PCT/US2015/013568, International Preliminary Report on Patentability dated Aug. 11, 2016, 7 pages.

(56) References Cited

OTHER PUBLICATIONS

International Application No. PCT/US2015/013568, International Search Report and Written Opinion dated Apr. 14, 2015, 8 pages.
International Application No. PCT/US2015/013570, International Preliminary Report on Patentability dated Aug. 11, 2016, 9 pages.
International Application No. PCT/US2015/013570, International Search Report and Written Opinion dated May 20, 2015, 10 pages.

\* cited by examiner

METHODS AND DEVICES FOR GENERATING MEDIA ITEMS

PRIORITY CLAIM AND RELATED APPLICATIONS

This application is a continuation of U.S. patent application Ser. No. 14/608,108, filed Jan. 28, 2015, entitled "Methods and Devices for Generating Media Items," which claims priority to U.S. Provisional Patent Application No. 61/975,651, filed Apr. 4, 2014, each of which is hereby expressly incorporated by reference in its entirety.

This application is related to U.S. patent application Ser. No. 14/608,097, filed Jan. 28, 2015, entitled, "Methods and Devices for Synchronizing and Sharing Media Items," U.S. patent application Ser. No. 14/608,099, filed Jan. 28, 2015, entitled, "Methods and Devices for Touch-Based Media Creation," U.S. patent application Ser. No. 14/608,103, filed Jan. 28, 2015, entitled, "Methods and Devices for Presenting Interactive Media Items," U.S. patent application Ser. No. 14/608,105, filed Jan. 28, 2015, entitled, "Methods and Devices for Modifying Pre-Existing Media Items," which are hereby incorporated by reference in their entirety.

TECHNICAL FIELD

The present invention relates to the field of Internet technologies, and more particularly to generating a media item based at least in part on one or more criteria received from a client device.

BACKGROUND OF THE INVENTION

As wireless networks and the processing power of mobile devices have improved, web-based applications increasingly allow everyday users to create original content in real-time without professional software. For example, Instagram and Vine allow a user to create original media content that is personalized to the user's tastes—anytime and anywhere. Despite the advances in the provision of web-based media creation applications, some solutions for creating media content are clumsy or ill-suited to future improvements in provisioning media content.

SUMMARY

Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to generate a media item based at least in part on information received from a client device, where the information at least includes one or more criteria (e.g., one or more audio tracks, keywords, etc.) for the media item to be generated.

In some embodiments, a method of generating a media item is performed at a server (e.g., server system 108, FIGS. 1 and 3) with one or more processors and memory. The method includes receiving, from a client device, information including one or more criteria (e.g., one or more audio tracks, keywords, etc.) for the media item to be generated. The method also includes identifying one or more media files in a database of media files (e.g., media item generation database 344, FIG. 5) for the media item to be generated based at least in part on the one or more criteria. The method further includes sending, to the client device, first information identifying the one or more media files. In some embodiments, the method further includes sending, to the client device, synchronization information for synchronizing the one or more audio tracks with the one or more identified media files.

In some embodiments, a method of generating a media item is performed at an electronic device (e.g., client device 104, FIGS. 1-2) with one or more processors, memory, and a display. The method includes detecting a user input identifying one or more criteria (e.g., one or more audio tracks, keywords, etc.) for a media item to be generated. In response to detecting the user input, the method also includes sending, to a server, information for the media item to be generated, the information including the one or more criteria. The method also includes receiving, from the server, first information identifying one or more media files for the media item and synchronization information for synchronizing one or more audio tracks with the one or more media files. The method further includes obtaining the one or more media files and the one or more audio tracks for the media item to be generated. The method further includes generating the media item, including: displaying the one or more media files on the display; and playing back the one or more audio tracks in synchronization with the one or more media files based on the synchronization information.

In some embodiments, a server (e.g., server system 108, FIGS. 1 and 3) or electronic device (e.g., client device 104, FIGS. 1-2) includes one or more processors and memory storing one or more programs for execution by the one or more processors, the one or more programs include instructions for performing, or controlling performance of, the operations of any of the methods described herein. In some embodiments, a non-transitory computer readable storage medium storing one or more programs, the one or more programs comprising instructions, which, when executed by a server (e.g., server system 108, FIGS. 1 and 3) or electronic device (e.g., client device 104, FIGS. 1-2) with one or more processors, cause the server or electronic device to perform, or control performance of, the operations of any of the methods described herein.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

Figure 1:
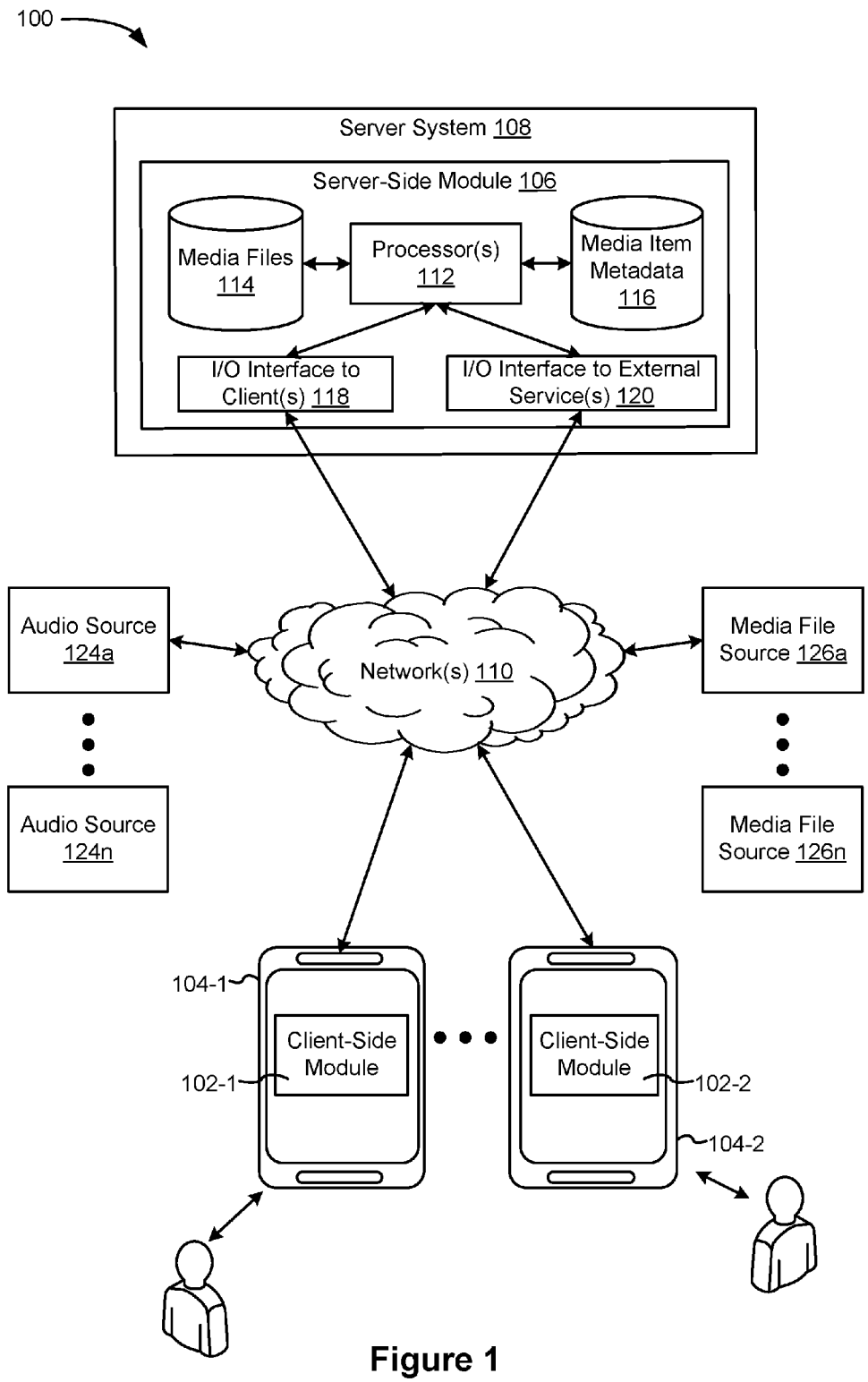
FIG. 1 is a block diagram of a server-client environment in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described herein in order to provide a thorough understanding of the example implementations illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

As shown in FIG. 1, an application for generating, exploring, and presenting media items is implemented in a server-client environment 100 in accordance with some embodiments. In some embodiments, the application includes client-side processing 102-1, 102-2 (hereinafter "client-side module 102") executed on a client device 104-1, 104-2 and server-side processing 106 (hereinafter "server-side module 106") executed on a server system 108. Client-side module 102 communicates with server-side module 106 through one or more networks 110. Client-side module 102 provides client-side functionalities associated with the application (e.g., creation and presentation of media items) such as client-facing input and output processing and communications with server-side module 106. Server-side module 106 provides server-side functionalities associated with the application (e.g., generating metadata structures for, storing portions of, and causing/directing presentation of media items) for any number of client modules 102 each residing on a respective client device 104.

In some embodiments, server-side module 106 includes one or more processors 112, media files database 114, media item metadata database 116, an I/O interface to one or more clients 118, and an I/O interface to one or more external services 120. I/O interface to one or more clients 118 facilitates the client-facing input and output processing for server-side module 106. One or more processors 112 receive requests from client-side module 102 to create media items or obtain media items for presentation. Media files database 114 stores media files, such as images and/or video clips, associated with media items, and media item metadata database 116 stores a metadata structure for each media item, where each metadata structure associates one or more media files and at least a portion of an audio track with a media item. In some embodiments, media files database 114 and media item metadata database 116 are communicatively coupled with but located remotely from server system 116. In some embodiments, media files database 114 and media item metadata database 116 are located separately from one another. In some embodiments, server-side module 106 communicates with one or more external services such as audio sources 124a . . . 124n and media file sources 126a . . . 126n through one or more networks 110. I/O interface to one or more external services 120 facilitates such communications.

Examples of client device 104 include, but are not limited to, a handheld computer, a wearable computing device (e.g., Google Glass or a smart watch), a biologically implanted computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices.

Examples of one or more networks 110 include local area networks ("LAN") and wide area networks ("WAN") such as the Internet. One or more networks 110 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), WiMAX, or any other suitable communication protocol.

In some embodiments, server system 108 is managed by the provider of the application for generating, exploring, and presenting media items. Server system 108 is implemented on one or more standalone data processing apparatuses or a distributed network of computers. In some embodiments, server system 108 also employs various virtual devices and/or services of third party service providers (e.g., third-party cloud service providers) to provide the underlying computing resources and/or infrastructure resources of server system 108.

Although server-client environment 100 shown in FIG. 1 includes both a client-side portion (e.g., client-side module 102) and a server-side portion (e.g., server-side module 106), in some embodiments, the application is implemented as a standalone application installed on client device 104. In addition, the division of functionalities between the client and server portions can vary in different embodiments. For example, in some embodiments, client-side module 102 is a thin-client that provides only user-facing input and output processing functions, and delegates all other data processing functionalities to a backend server (e.g., server system 108).

Figure 2:
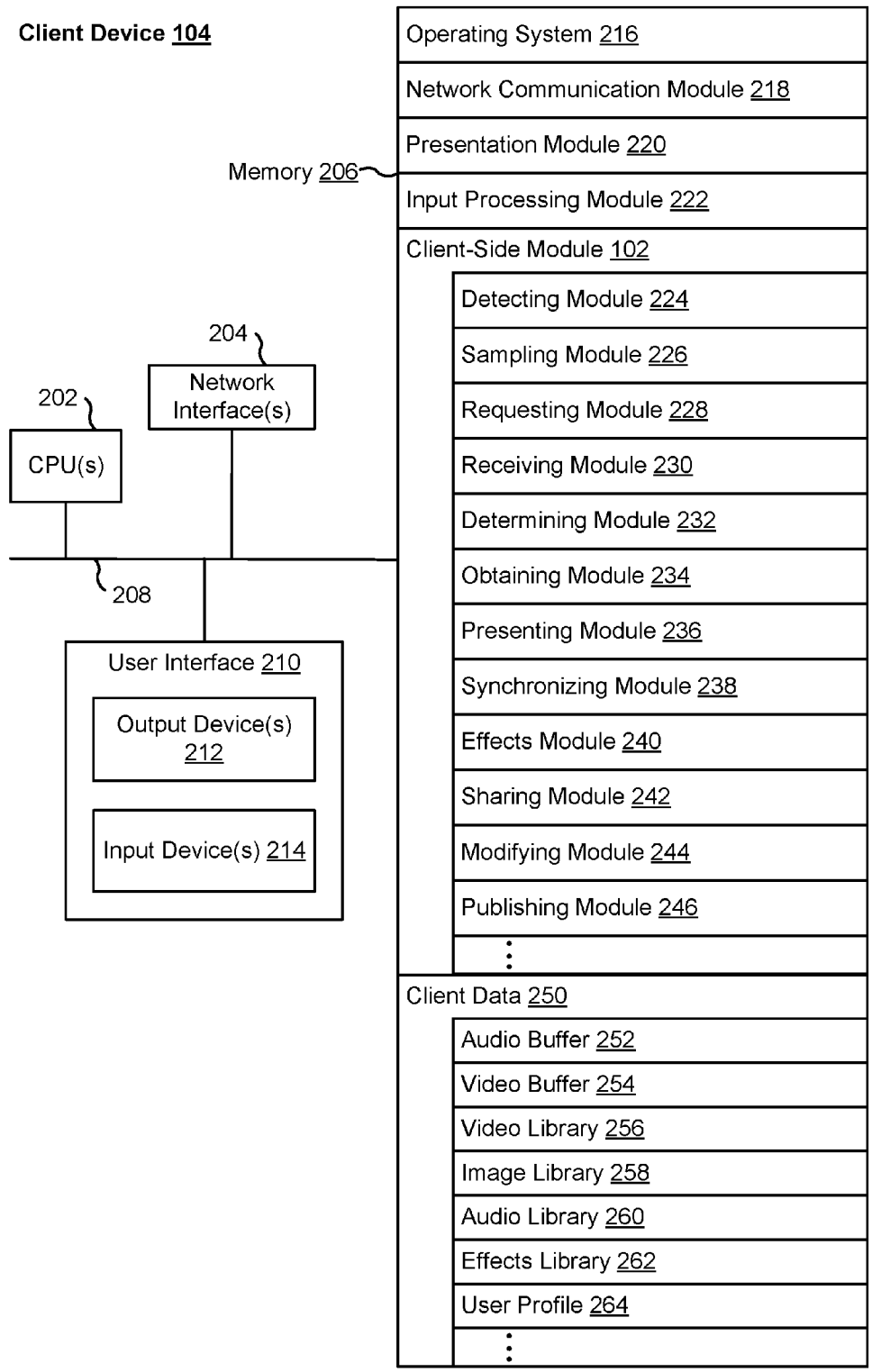
FIG. 2 is a block diagram of a client device in accordance with some embodiments.

FIG. 2 is a block diagram illustrating a representative client device 104 associated with a user in accordance with some embodiments. Client device 104, typically, includes one or more processing units (CPUs) 202, one or more network interfaces 204, memory 206, and one or more communication buses 208 for interconnecting these components (sometimes called a chipset). Client device 104 also includes a user interface 210. User interface 210 includes one or more output devices 212 that enable presentation of media content, including one or more speakers and/or one or more visual displays. User interface 210 also includes one or more input devices including user interface components that facilitate user input such as a keyboard, a mouse, a voice-command input unit or microphone, an accelerometer, a gyroscope, a touch-screen display, a touch-sensitive input pad, a gesture capturing camera, or other input buttons or controls. Furthermore, some client devices 104 use a microphone and voice recognition, a camera and gesture recognition, one or more biological sensors, a brainwave sensor/display, or biologically implanted sensors/displays (e.g. digital contact lenses, fingertip/muscle implants, and so on) to supplement or replace the keyboard, display, or touch screen. Memory 206 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 206, optionally, includes one or more storage devices remotely located from one or more processing units 202. Memory 206, or alternatively the non-volatile memory device(s) within memory 206, includes a non-transitory computer readable storage medium. In some implementations, memory 206, or the non-transitory computer readable storage medium of memory 206, stores the following programs, modules, and data structures, or a subset or superset thereof:

- operating system 216 including procedures for handling various basic system services and for performing hardware dependent tasks;
- network communication module 218 for connecting user device 104 to other computing devices (e.g., server system 108, audio sources 124a . . . 124n, and media file sources 126a . . . 126n) connected to one or more networks 110 via one or more network interfaces 204 (wired or wireless);
- presentation module 220 for enabling presentation of information (e.g., a media item, a user interface for an application or a webpage, audio and/or video content, text, etc.) at client device 104 via one or more output devices 212 (e.g., displays, speakers, etc.) associated with user interface 210; and
- input processing module 222 for detecting one or more user inputs or interactions from one of the one or more input devices 214 (e.g., mouse, keyboard, touch screen display, etc.) and interpreting the detected input or interaction.

In some embodiments, memory 206 also includes a client-side module 102 associated with an application for creating, exploring, and playing back media items that includes, but is not limited to:

- detecting module 224 for detecting one or more user inputs corresponding to one or more criteria (e.g., one or more audio tracks, keywords, genre, etc.) for a media item to be generated;
- sampling module 226 for sampling one or more environmental parameters associated with client device 104 or the user of client device 104 via one or more input devices 214 (e.g., one or more biological sensors, accelerometer, etc.);
- requesting module 228 for sending to a server (e.g., server system 108) information for the media item to be generated, the information includes the one or more criteria (e.g., one or more audio tracks, keywords, genre, etc.) and, optionally, the one or more sampled environmental parameters;
- receiving module 230 for receiving, from server system 108, first information identifying one or more media files (e.g., one or more video clips and/or one or more images), optional second information identifying one or more audio tracks associated with the requested media item, and synchronization information for synchronizing the one or more audio tracks with the one or more media files;
- determining module 232 for determining a source for the one or more audio tracks (e.g., one or more audio sources 124 and/or audio library 260) and a source for the one or more media files (e.g., one or more media file sources 126, media files database 114, video library 256, and/or image library 258);
- obtaining module 234 for obtaining the one or more audio tracks and the one or more media files from the determined source(s);
- presenting module 236 for presenting the media item via one or more output devices 212 by displaying the one or more media files associated with the media item on the display and playing back at least the portion of the audio track via the one or more speakers associated with the media item;
- synchronizing module 238 for synchronizing at least the one or more audio tracks with the one or more media files based on the synchronization information;
- effects module 240 for applying transition effects while displaying the one or more media files;
- sharing module 242 for sharing the media item via one or more sharing methods (e.g., email, SMS, social media outlets, etc.);
- modifying module 244 for modifying the media item so as to generate a new media item; and
- publishing module 246 for publishing the media item or the new media item based on the modified media item.

In some embodiments, memory 206 also includes client data 250 for storing data for the application. Client data 250 includes, but is not limited to:

- audio buffer 252 for buffering the one or more obtained audio tracks;
- video buffer 254 for buffering the one or more obtained media files;
- video library 256 storing one or more pre-existing video clips recorded prior to executing the application;
- image library 258 storing one or more pre-existing images captured prior to executing the application;
- audio library 260 storing one or more pre-existing audio tracks created or stored prior to executing the application;
- effects library 262 including functions for implementing one or more real-time or post-processed audio and/or video effects (e.g., OpenGL Shading Language (GLSL) shaders); and
- user profile 264 including a plurality of preferences associated with the application for the user of client device 104 such as user likes/dislikes, media items previously viewed by the user, media item liked or favorited by the user, and so on.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above. In some embodiments, the programs, modules, and data structures stored in memory 206, or the computer readable storage medium of memory 206, provide instructions for implementing respective operations in the methods described below with reference to FIGS. 6A-6B.

Figure 3:
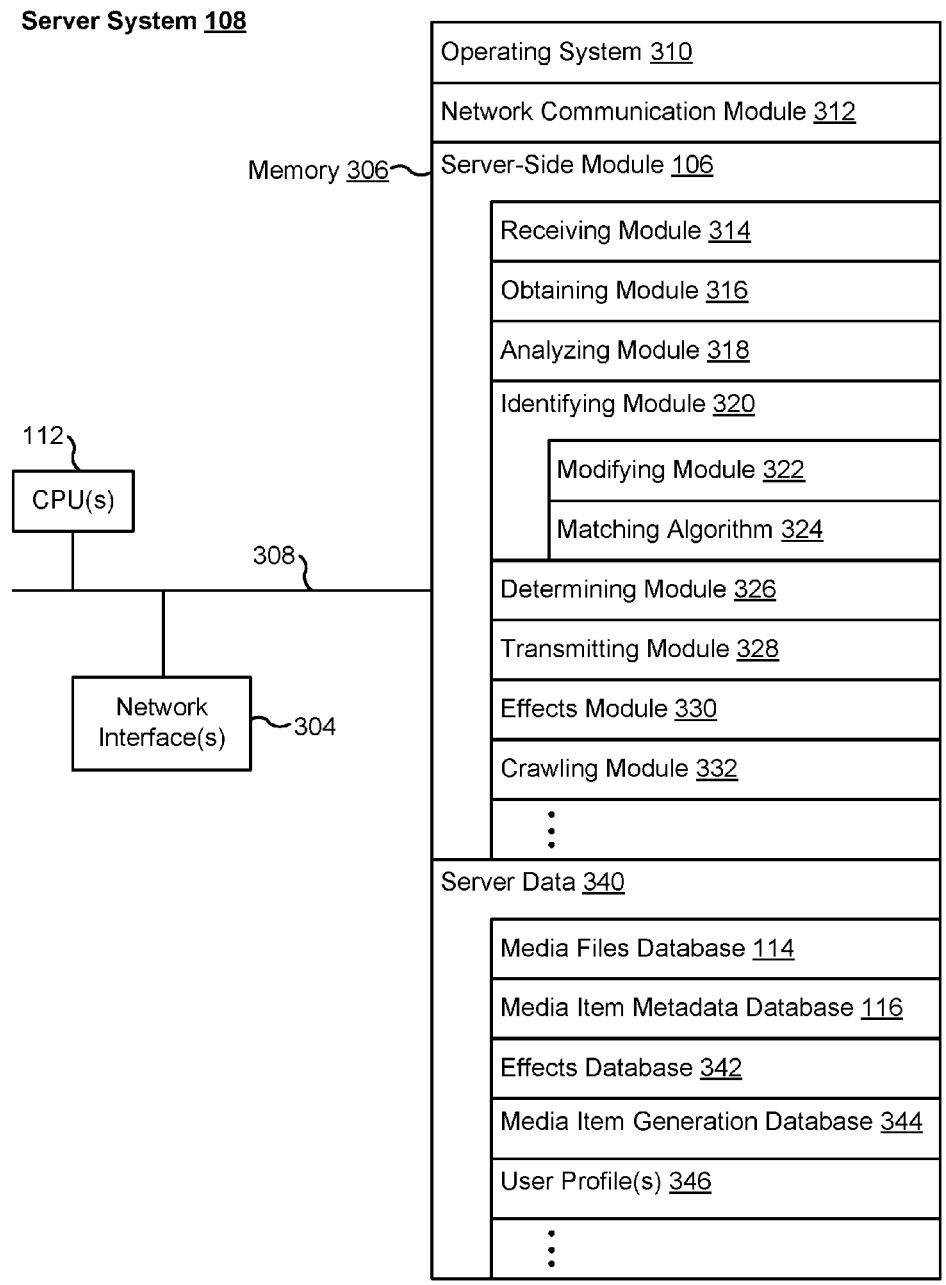
FIG. 3 is a block diagram of a server system in accordance with some embodiments.

FIG. 3 is a block diagram illustrating server system 108 in accordance with some embodiments. Server system 108, typically, includes one or more processing units (CPUs) 112, one or more network interfaces 304 (e.g., including I/O interface to one or more clients 118 and I/O interface to one or more external services 120), memory 306, and one or more communication buses 308 for interconnecting these components (sometimes called a chipset). Memory 306 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 306, optionally, includes one or more storage devices remotely located from one or more processing units 112. Memory 306, or alternatively the non-volatile memory device(s) within memory 306, includes a non-transitory computer readable storage medium. In some implementations, memory 306, or the non-transitory computer readable storage medium of memory 306, stores the following programs, modules, and data structures, or a subset or superset thereof:

- operating system 310 including procedures for handling various basic system services and for performing hardware dependent tasks;
- network communication module 312 that is used for connecting server system 108 to other computing devices (e.g., client devices 104, audio sources 124a . . . 124n, and media file sources 126a . . . 126n) connected to one or more networks 110 via one or more network interfaces 304 (wired or wireless);
- a server-side module 106 associated with the application for generating, exploring, and presenting media items that includes, but is not limited to:
  - receiving module 314 for receiving, from a respective client device 104, information including one or more criteria (e.g., one or more audio tracks, keywords, genre, etc.) for the media item to be generated;
  - obtaining module 316 for obtaining a user profile, or one or more portions thereof, associated with the user of respective client device 104;
  - analyzing module 318 for analyzing an audio track or media file so as to generate a characteristic fingerprint including audio and/or video characteristics of the audio track or media file;
  - identifying module 320 for identifying one or more media files in a media item generation database 344 for the media item to be generated based at least in part on the one or more received criteria, including but not limited to:
    - modifying module 322 for modifying matching algorithm 324 in response to receiving feedback from respective client device 104; and
    - matching algorithm 324 for matching one or more media files in media item generation database 344 to the one or more received criteria with a predefined degree of accuracy;
  - determining module 326 for, optionally, determining one or more audio tracks for the media item to be generated based at least in part on the one or more received criteria;
  - transmitting module 328 for sending, to respective client device 104, first information identifying the one or more media files, optional second information identifying the one or more audio tracks, and synchronization information for synchronizing the one or more audio tracks with the one or more media files;
  - effects module 330 for receiving and transmitting video and/or audio effects (i.e., transition effects) as scripts or computer-readable instructions (e.g., GLSL shaders for use with OpenGL ES) augmented with effect metadata corresponding to effect type, effect version, content, effect parameters, and so on; and
  - crawling module 332 for analyzing one or more media files available from one or more content sources (e.g., media file sources 126) and adding entries corresponding to the one or more analyzed media files to media item generation database 344;
- server data 340, including but not limited to:
  - media files database 114 storing one or more media files (e.g., images and/or video clips);
  - media item metadata database 116 storing a metadata structure for each media item, where each metadata structure associates one or more media files and at least a portion of an audio track with a media item;
  - effects database 342 storing one or more real-time or post-processed audio and/or video effects as scripts or computer-readable instructions (e.g., GLSL shaders for use with OpenGL ES) augmented with effect metadata corresponding to effect type, effect version, content, effect parameters, a table mapping of interactive input modalities to effect parameters for real-time effect interactivity, and so on;
  - media item generation database 344 storing a plurality of entries each corresponding to a video clip; and
  - one or more user profiles 346 storing one or more user profiles or one or more parameters thereof obtained from one or more client devices.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above. In some embodiments, the programs, modules, and data structures stored in memory 306, or the computer readable storage medium of memory 306, provide instructions for implementing respective operations in the methods described below with reference to FIGS. 7A-7C.

Attention is now directed towards embodiments of user interfaces and associated processes that may be implemented on a respective client device 104 with one or more speakers 402 enabled to output sound, zero or more microphones 404 enabled to receive sound input, and a touch screen 406 (sometimes also herein called a touch screen display) enabled to receive one or more contacts and display information (e.g., media content, webpages and/or user interfaces for an application). FIGS. 4A-4E illustrate example user interfaces for generating a media item in accordance with some embodiments.

Although some of the examples that follow will be given with reference to inputs on touch screen 406 (where the touch sensitive surface and the display are combined), in some embodiments, the device detects inputs on a touch-sensitive surface that is separate from the display. In some embodiments, the touch sensitive surface has a primary axis that corresponds to a primary axis on the display. In accordance with these embodiments, the device detects contacts with the touch-sensitive surface at locations that correspond to respective locations on the display. In this way, user inputs detected by the device on the touch-sensitive surface are used by the device to manipulate the user interface on the display of the device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

FIGS. 4A-4E show user interface 408 displayed on client device 104 (e.g., a mobile phone) for an application for generating, exploring, and presenting media items; however, one skilled in the art will appreciate that the user interfaces shown in FIGS. 4A-4E may be implemented on other similar computing devices. The user interfaces in FIGS. 4A-4E are used to illustrate the processes described herein, including the processes described with respect to FIGS. 6A-6B.

Figure 4A:
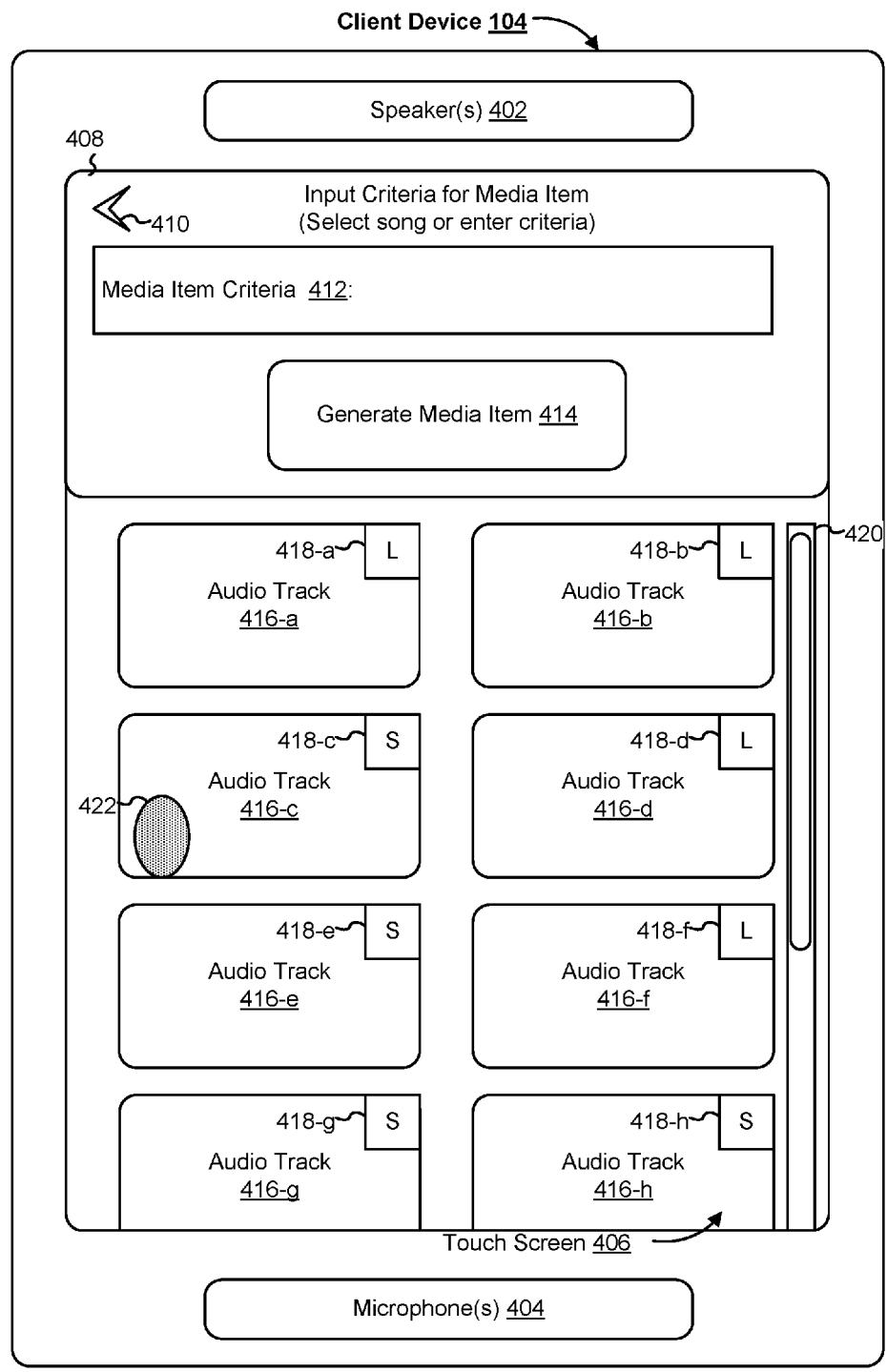
FIGS. 4A-4E illustrate example user interfaces for generating a media item in accordance with some embodiments.

FIG. 4A illustrates client device 104 displaying a user interface of a process for automatically generating a synchronized media item on touch screen 406. In FIG. 4A, the user interface prompts the user of client device 104 to input criteria for the media item to be generated by server system 108. The user of client device 104 is able to enter criteria in media item criteria box 412 via a virtual keyboard. For example, the criteria include a song title, a genre, keywords, and the like for the media item to be generated. In FIG. 4A, the user interface also includes "Generate Media Item" affordance 414, which, when activated (e.g., by a touch input from the user), causes client device 104 to send, to server system 108, the one or more criteria entered in media item criteria box 412 for the media item to be generated.

Alternatively, the user of client device 104 is able select one of a plurality of audio track affordances 416 corresponding to audio tracks for the media item to be generated. In some embodiments, audio track affordances 416 corresponding to sponsored audio tracks are displayed at the top or near the top of the feed of audio affordances in the user interface. In some embodiments, each audio track affordance 416 includes album cover art or an associated image, artist name, and track title for the corresponding audio track. In FIG. 4A, each audio track affordance 416 includes a source indicator 418. For example, source indicator 418-a displays an "L" indicating that the audio track corresponding to audio track affordance 416-a is available locally (i.e., stored at client device 104 in audio library 260), and source indicator 418-c displays an "S" indicating that the audio track corresponding to audio track affordance 416-c is available via a streaming audio service provider (e.g., from one or more audio sources 124). In FIG. 4A, back navigation affordance 410, when activated (e.g., by a touch input from the user), causes client device 104 to display a previous user interface (e.g., a home screen for the application). In FIG. 4A, scroll bar 420 indicates that the balance of the audio tracks can be viewed by scrolling downwards.

FIG. 4A also illustrates client device 104 detecting contact 422 (e.g., a tap gesture) on touch screen 406 at a location corresponding to audio track affordance 416-c. For example, in response to detecting contact 422, client device 104 sends, to server system 108, information for the media item to be generated including an indication of the audio track corresponding to audio track affordance 416-c.

Figure 4B:
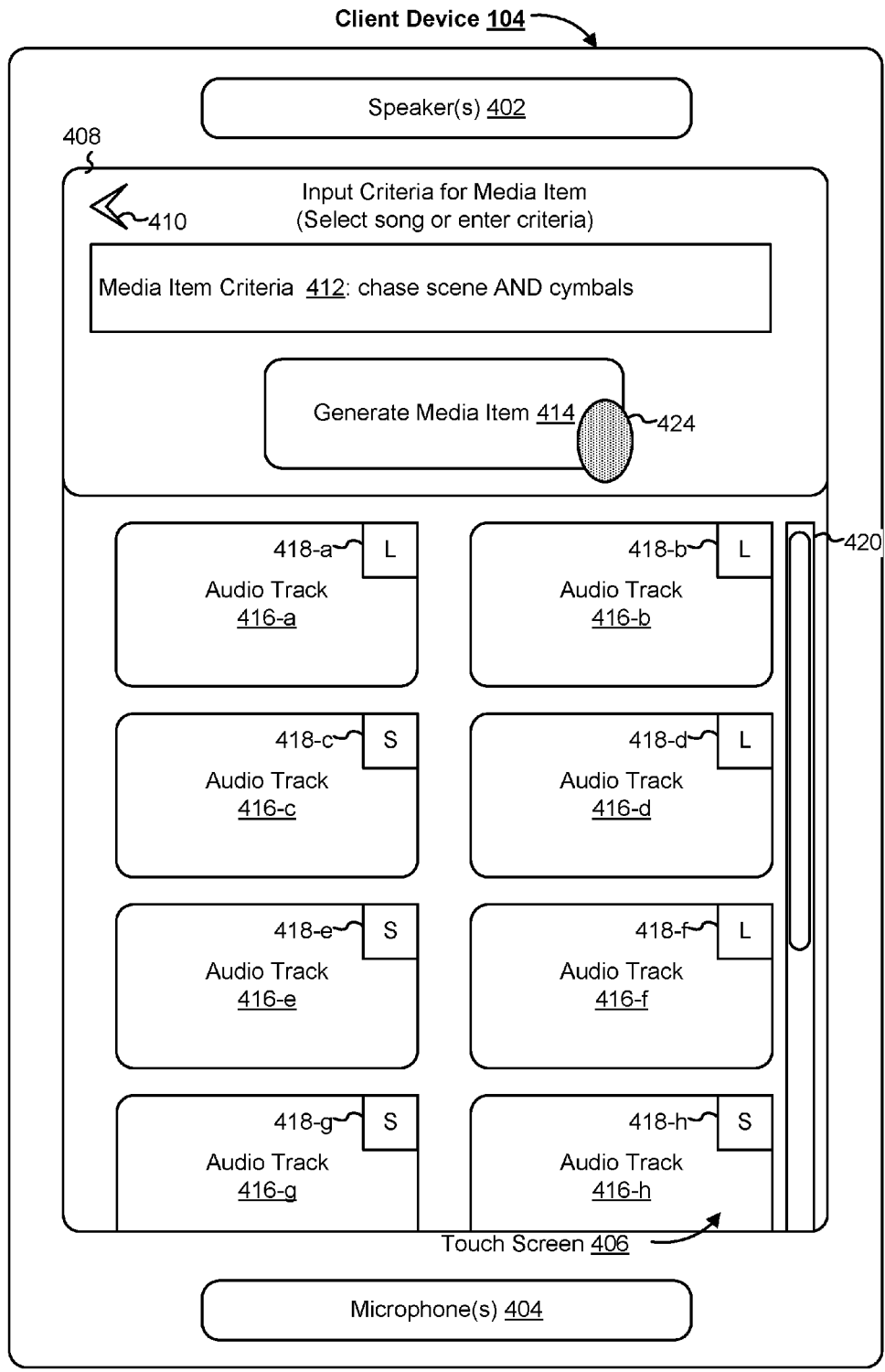

FIG. 4B illustrates client device 104 displaying a user interface of a process for automatically generating a synchronized media item on touch screen 406. In FIG. 4B, media item criteria box 412 displays keywords (e.g., "chase scene AND cymbals") previously entered by the user of client device 104 for the media item to be generated. FIG. 4B also illustrates client device 104 detecting contact 424 (e.g., a tap gesture) on touch screen 406 at a location corresponding to "Generate Media Item" affordance 414. For example, in response to detecting contact 424, client device 104 sends, to server system 108, information for the media item to be generated including the keywords "chase scene" and "cymbals" entered in media item criteria box 412.

Figure 4C:
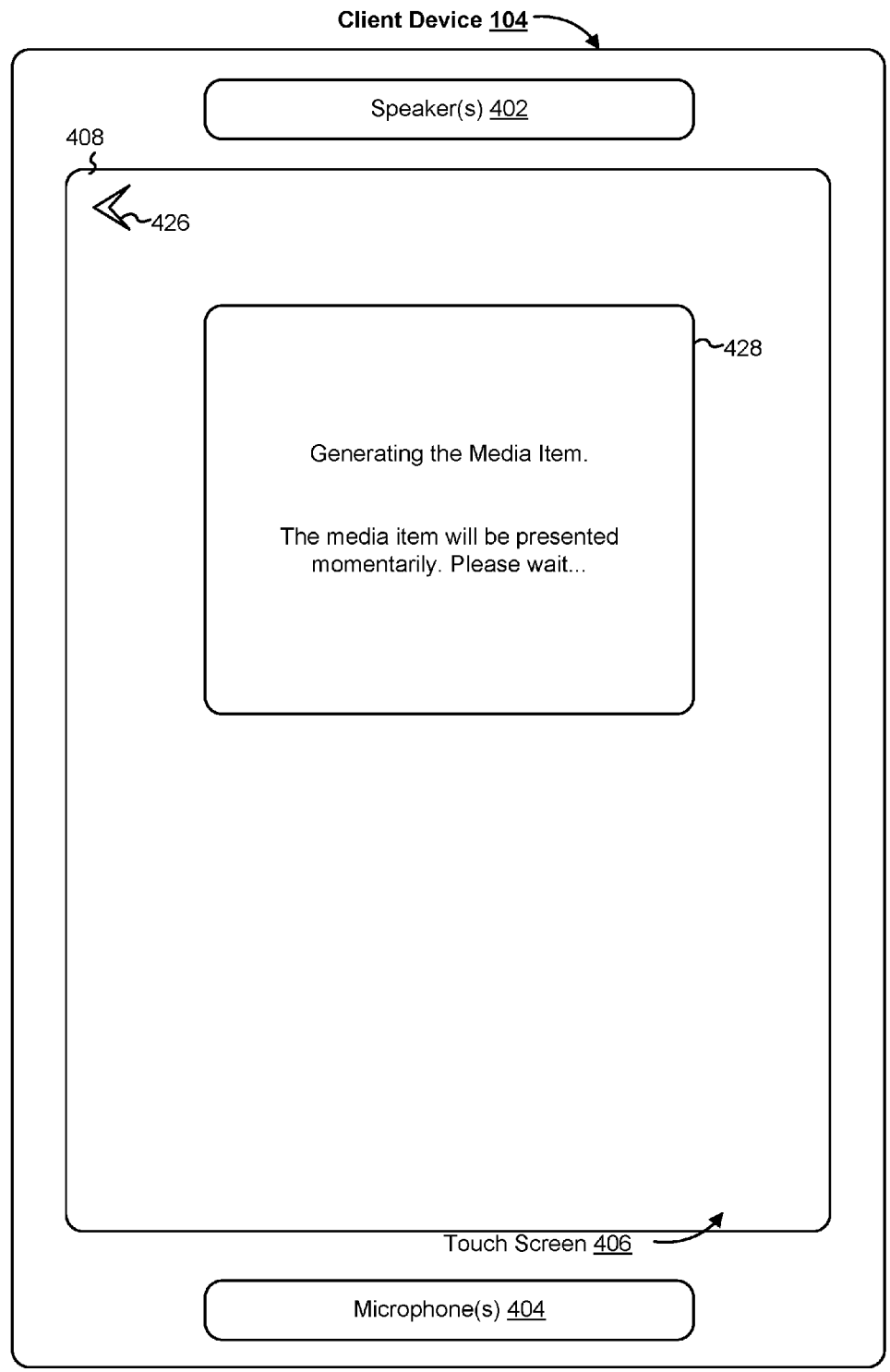

FIG. 4C illustrates client device 104 displaying notification 428 in response to detecting contact 422 in FIG. 4A or contact 424 in FIG. 4B. In FIG. 4C, notification 428 indicates to the user of client device 104 that the media item is currently being generated by server system 108 based on the criteria entered in FIG. 4A or FIG. 4B. In FIG. 4C, notification 428 further notifies the user of client device 104 to wait for the media item to be presented. In FIG. 4C, back navigation affordance 426, when activated (e.g., by a touch input from the user), causes client device 104 to send a request to server system 108 to abort the media item generation process and also causes client device 104 to display a previous user interface (e.g., the user interface in FIG. 4A).

Figure 4D:
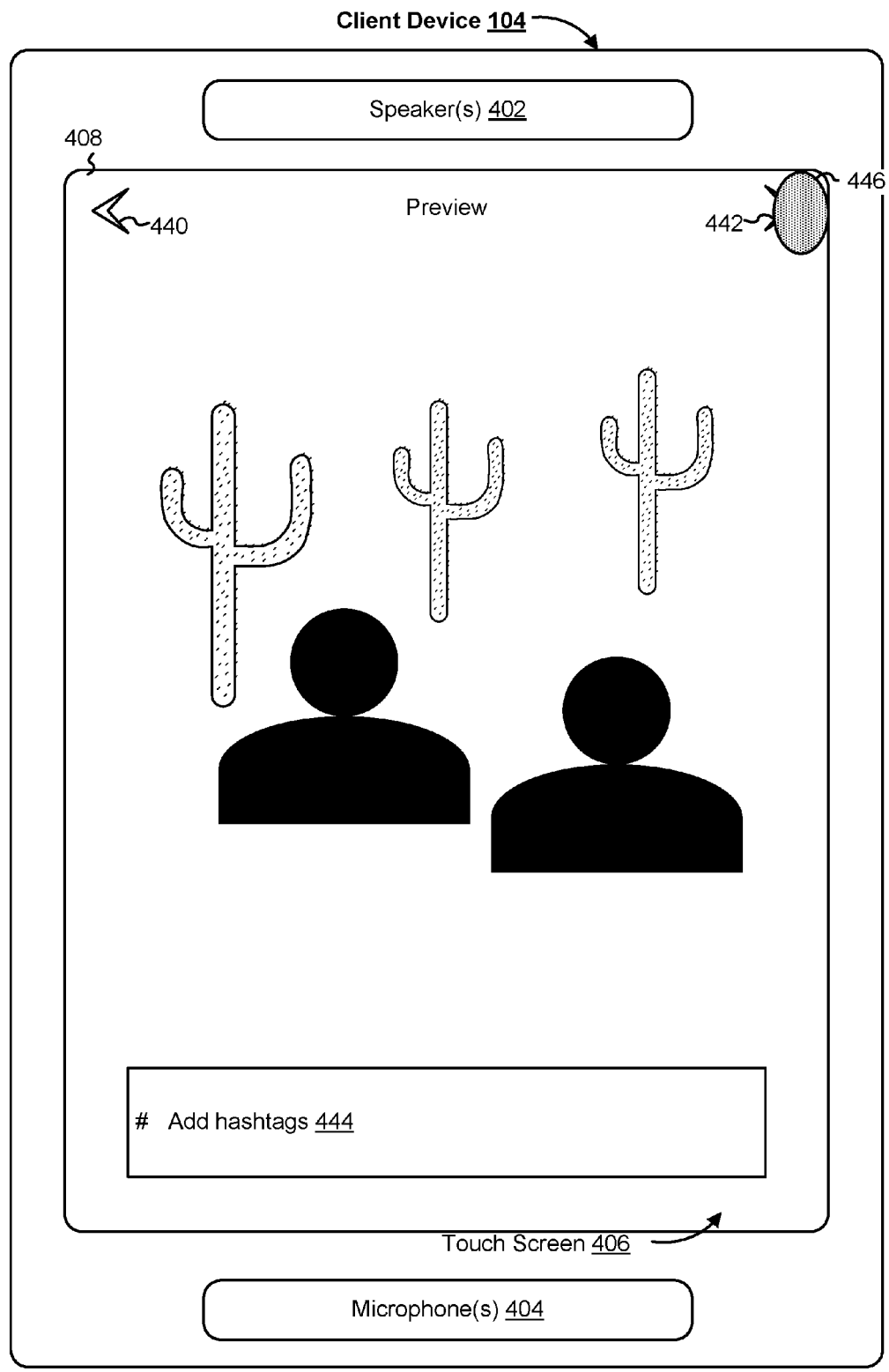

FIG. 4D illustrates client device 104 presenting a preview of the media item generated by server system 108. In FIG. 4D, the user interface includes text entry box 444 for adding a comment or hashtag to the media item. In FIG. 4D, the user interface also includes back navigation affordance 440, which, when activated (e.g., by a touch input from the user), causes client device 104 to display a previous user interface (e.g., the user interface in FIG. 4A) and forward navigation affordance 442, which, when activated (e.g., by a touch input from the user), causes client device 104 to display a next user interface (e.g., the user interface in FIG. 4E). FIG. 4D also illustrates client device 104 detecting contact 446 on touch screen 406 at a location corresponding to forward navigation affordance 442.

Figure 4E:
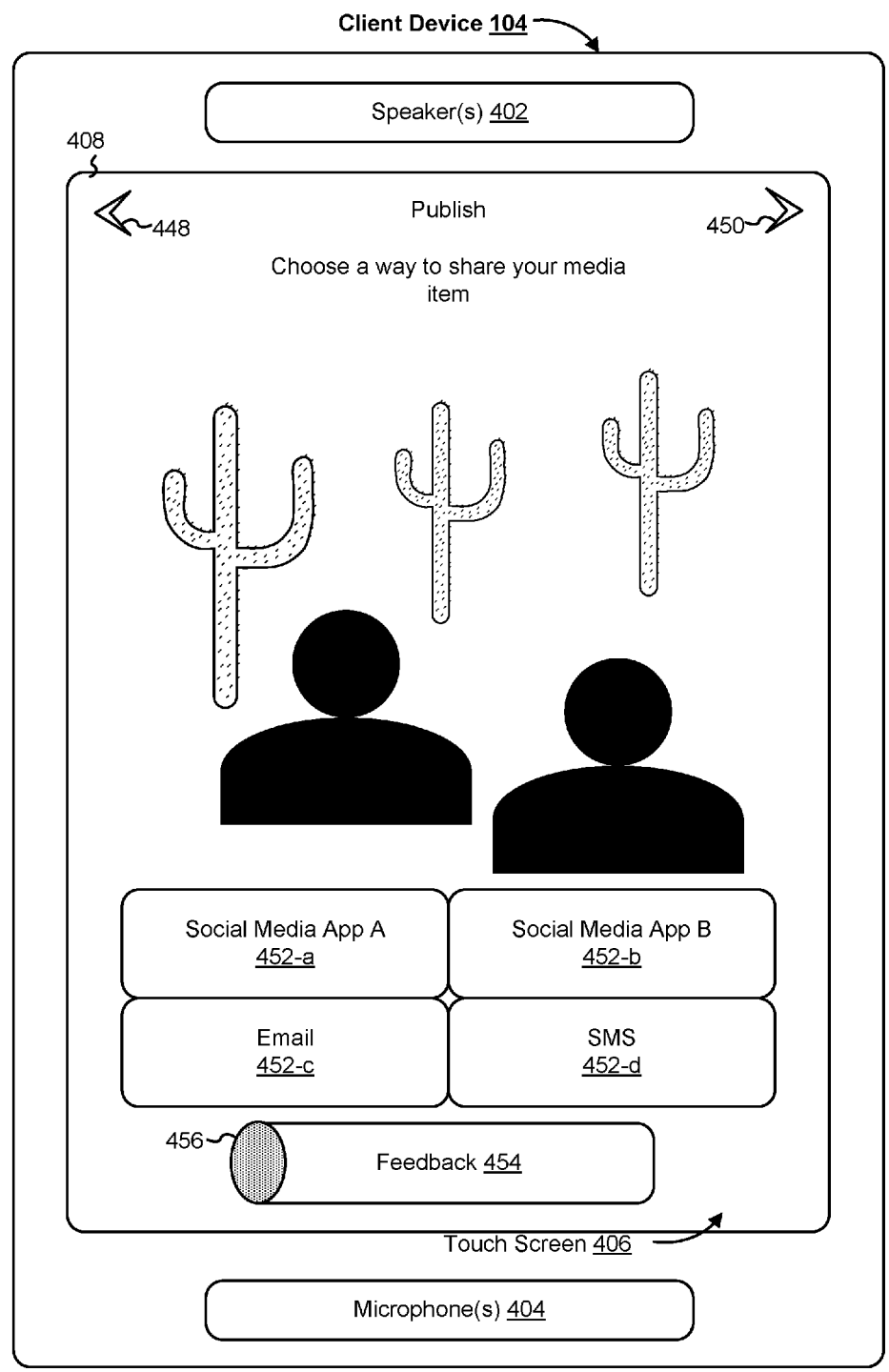

FIG. 4E illustrates client device 104 displaying a publication user interface for the media item in response to detecting contact 446 selecting forward navigation affordance 442 in FIG. 4D. In FIG. 4E, the user interface prompts the user of client device 104 to choose a method to share the media item. In FIG. 4E, the user interface includes a plurality of options 452 for sharing the media item (e.g., social media application A 452-a, social media application B 452-b, email 452-c, and SMS 452-d). For example, the application is configured to share the media item by sending a link to the media item via the selected option 452. In FIG. 4E, the user interface also includes back navigation affordance 448, which, when activated (e.g., by a touch input from the user), causes client device 104 to display a previous user interface (e.g., the user interface in FIG. 4D) and forward navigation affordance 450, which, when activated (e.g., by a touch input from the user), causes client device 104 to cause the media item to be published and display a home screen for the application.

In FIG. 4E, the user interface further includes feedback affordance 454, which, when activated (e.g., by a touch input from the user), causes client device 104 to display a feedback interface enabling the user of client device to enter feedback information as to the accuracy of the media item generated by server system 108. FIG. 4E also illustrates client device 104 detecting contact 456 on touch screen 406 at a location corresponding to feedback affordance 454. For example, in response to detecting contact 456, client device 104 displays the feedback interface. Continuing with this example, the user of client device provides feedback information as to whether the media item generated by server system 108 matches the user's intentions for the media item. For example, the user's intention were indicated via the one or more criteria entered by the user in FIG. 4A or 4B.

Figure 5:
FIG. 5 is a block diagram of a media item generation database in accordance with some embodiments.

FIG. 5 is a block diagram of media item generation database 344 in accordance with some embodiments. In some embodiments, database/table 344 is stored at server system 108, and, in some other embodiments, media item generation database 344 is stored in a database remote from but communicatively coupled with server system 108. Media item generation database 344 includes a plurality of entries each corresponding to a video clip. As shown in FIG. 5, a respective entry in media item generation database 344 includes a subset of superset of following parameters:

- unique video clip identifier 512 ("ID") corresponding to a respective video clip;
- one or more video clip pointers 514 (e.g., URLs) to one or more sources (e.g., media file sources 126 and/or media files database 114) of the respective video clip;
- metadata 516 corresponding to the respective video clip such as title, director, release date, genre, time period, keywords, most watched scenes, user rating, MPAA rating, actors, and so on;
- one or more audio tracks 518 associated with the respective video clip (e.g., audio tracks previously matched with the respective video clip or audio tracks originally included in respective video clip);
- one or more audio track pointers 520 to one or more sources (e.g., audio track sources 124) of one or more audio tracks 518;
- keywords or hashtags 522 corresponding to the respective video clip (e.g., previously associated with the respective video clip by other users in the community of users associated with the application);
- extracted characteristics 524 extracted from the respective video clip by analyzing module 318 (FIG. 3), for example, including motion, color, person, gender, race, objects, products, time of day, visual tempo, mood, and so on in the respective video clip; and
- effect information 526 including transition effects for combining the respective video clip with other video clips and/or interactive and/or static effects associated with the respective video clip.

In some embodiments, server system 108 or a component thereof (e.g., identifying module 320, FIG. 3) is configured to identify one or more media files (e.g., video clips) for a media item to be generated according to matching algorithm 324. In some embodiments, matching algorithm 324 is configured to identify one or more media files in media item generation database 344 that match the information (e.g., including one or more criteria for the media item to be generated such as an audio track, keywords, genre, etc.) received from client device 104 with a predefined degree of accuracy.

For example, the one or more criteria for the media item to be generated include a respective audio track for the media item to be generated. In some embodiments, identifying module 320 is configured to identify one or more media files that were previously matched to the respective audio track as indicated in parameters 418 of media item generation database 344. Alternatively, in some embodiments, analyzing module 318 is configured to generate a characteristic fingerprint for the audio track, and, subsequently, matching algorithm 324 is configured to identify one or more media files in media item generation database 344 whose extracted characteristics 524 match the characteristic fingerprint for the audio track with a predefined degree of accuracy.

In another example, the one or more criteria for the media item to be generated include keywords for the media item to be generated (e.g., "serene and fairy tale" or "dark and 18th century") or an indication of a genre for the media item to be generated (e.g., steel drum, acid jazz, and the like). In some embodiments, identifying module 320 is configured to identify one or more media files in media item generation database 344 whose metadata 416 and/or keywords/hashtags 422 match the keywords or genre indication in the one or more received criteria according to matching algorithm 324 with a predefined degree of accuracy. In some embodiments, when the information received from client device 104 does not include one or more audio tracks for the media item to generated, determining module 326 is configured to determine one or more audio tracks for the media item to be generated after identifying the one or more media files. In some embodiments, determining module 326 is configured to determine one or more audio tracks that were previously matched to the identified one or more media files as indicated in parameters 418 of media item generation database 344. Alternatively, in some embodiments, determining module 326 is configured to determine one or more audio tracks whose characteristic fingerprints match the extracted characteristics 524 for the identified one or more media files with a predefined degree of accuracy.

Figure 6A:
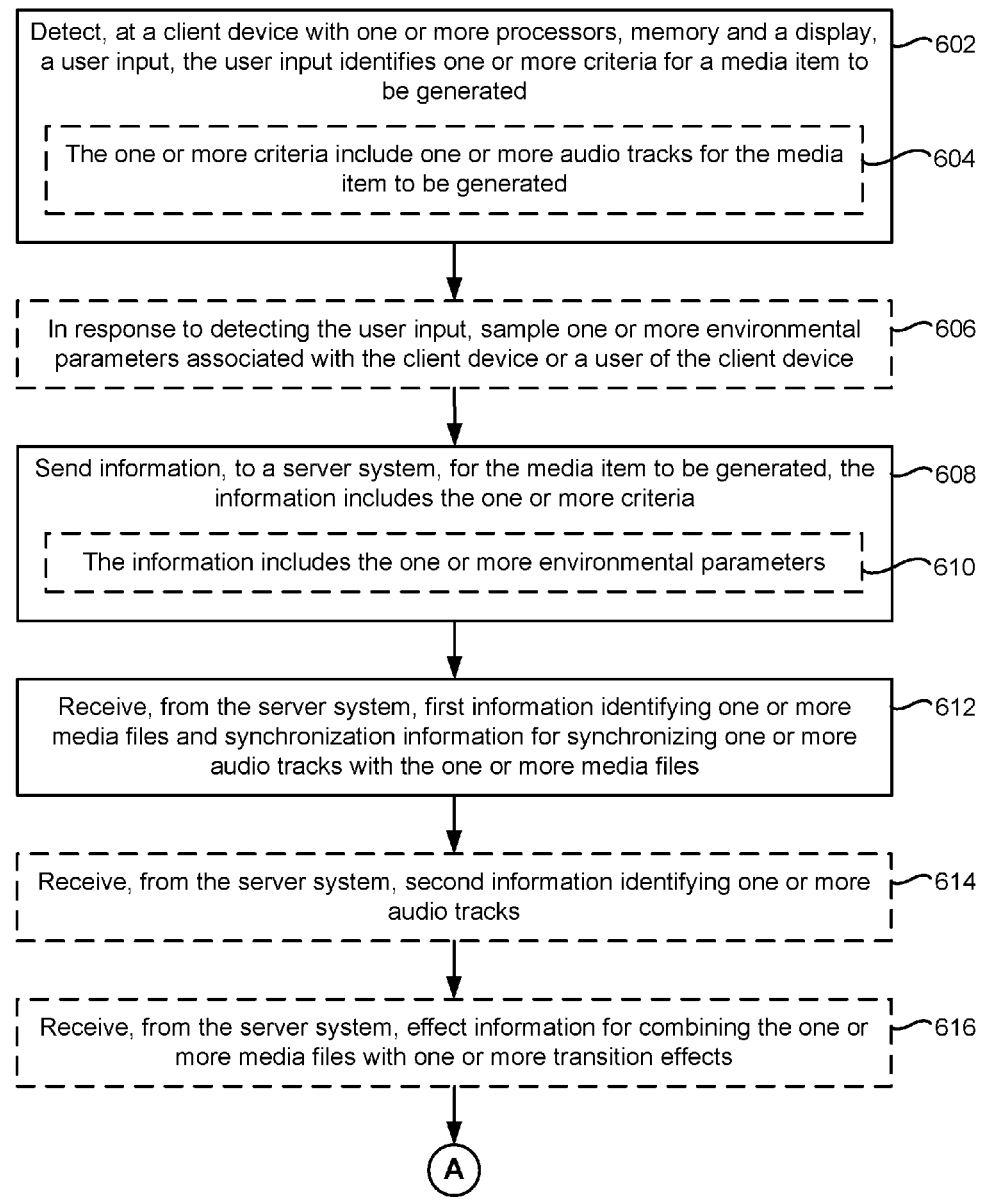
FIGS. 6A-6B illustrate a flowchart representation of a client-side method of generating a media item in accordance with some embodiments.
Figure 6B:
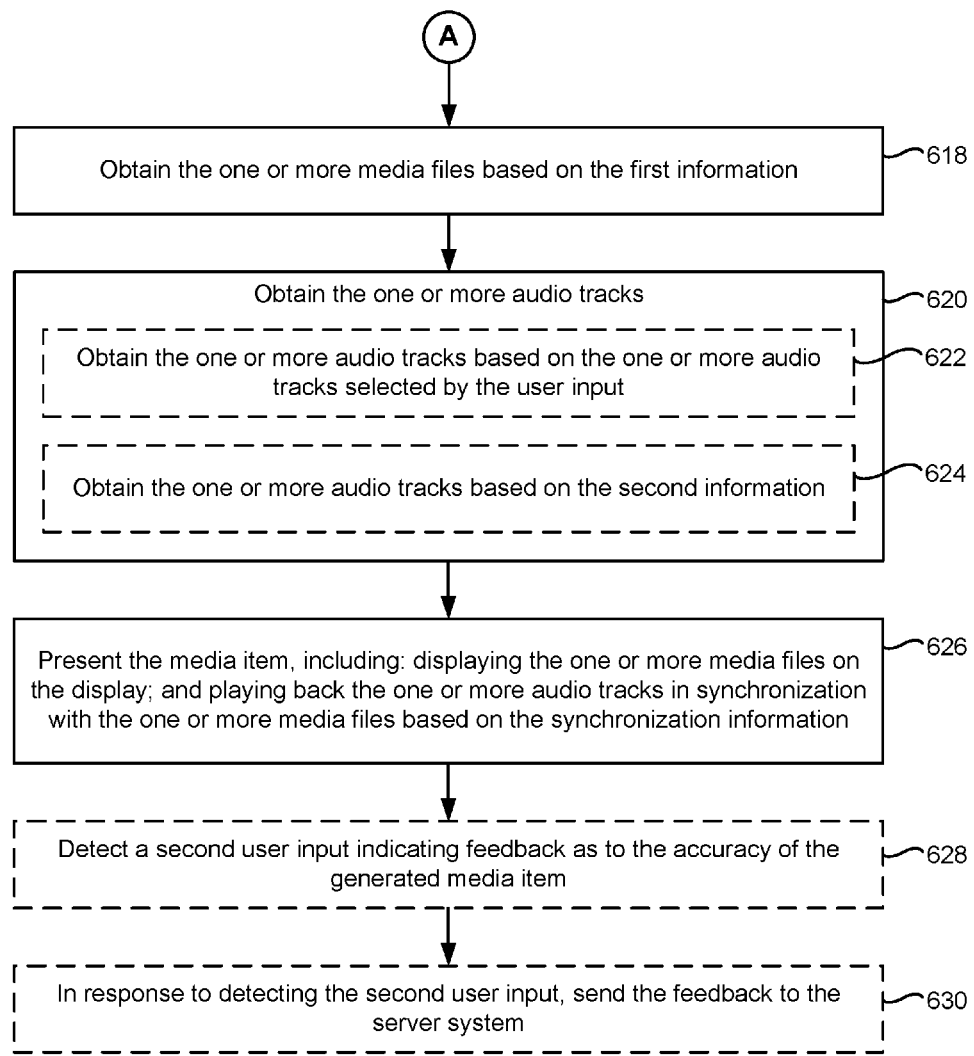

FIGS. 6A-6B illustrate a flowchart diagram of a method 600 of generating a media item in accordance with some embodiments. In some embodiments, method 600 is performed by an electronic device with one or more processors, memory, and a display. For example, in some embodiments, method 600 is performed by client device 104 (FIGS. 1-2) or a component thereof (e.g., client-side module 102, FIGS. 1-2). In some embodiments, method 600 is governed by instructions that are stored in a non-transitory computer readable storage medium and the instructions are executed by the one or more processors of client device 104. Optional operations are indicated by dashed lines (e.g., boxes with dashed-line borders).

The client device detects (602) a user input identifying one or more criteria for a media item to be generated. In some embodiments, the one or more criteria include an audio track for the media item to be generated. FIG. 4A, for example, shows client device 104 detecting a user input (e.g., contact 422) selecting an audio track corresponding to audio affordance 416-c for the media item to be generated. In some embodiments, the one or more criteria include one or more keywords for the media item to be generated. FIG. 4B, for example, shows client device 104 detecting a user input (e.g., contact 424) selecting "Generate Media Item" affordance 414 so as to send the keywords (e.g., "chase scene AND cymbals") entered into media item criteria box 412 by the user of client device 104 as the one or more criteria for the media item to be generated. In some embodiments, the one or more criteria include other information for the media item to be generated such as a title of an audio track, a title of a video or video clip, a genre, a mood, and so on.

In some embodiments, the one or more criteria include (604) one or more selected audio tracks for the media item to be generated. FIG. 4A, for example, shows client device 104 detecting a user input (e.g., contact 422) selecting an audio track corresponding to audio affordance 416-*c* for the media item to be generated.

In some embodiments, in response to detecting the user input, client device samples (606) one or more environmental parameters associated with client device 104 or a user of client device 104. In some embodiments, sampling module 226 (FIG. 2) is configured to sample one or more environmental parameters associated with client device 104 or a user of client device 104. For example, in response to detecting the user input (e.g., contact 422 in FIG. 4A or contact 424 in FIG. 4B), sampling module 226 samples one or more environmental parameters produced by one or more input devices 214 of client device 104 such as the time and date, location of client device 104, readings from the accelerometer and/or gyroscope, readings from the one or more biological sensors (e.g., heart rate, blood pressure, gait, galvanic skin response, pupillary reflex, and the like), readings from the brainwave sensor or other biologically implanted sensors, and/or readings from other sensors of client device 104.

The client device sends (608) information to server system 108 for the media item to be generated, the information includes the one or more criteria. In some embodiments, requesting module 228 (FIG. 2) is configured to send information to server system 108 for the media item, the information includes the one or more criteria (e.g., the audio track corresponding to audio track affordance 416-*c* selected in FIG. 4A or the keywords in media item criteria box 412 in FIG. 4B).

In some embodiments, the information includes (610) the one or more sampled environmental parameters. In some embodiments, requesting module 228 (FIG. 2) is configured to send information to server system 108 for the media item, the information includes the one or more criteria indicated via the detected user input from the user of client device 104 (e.g., the audio track corresponding to audio track affordance 416-*c* selected in FIG. 4A or the keywords in media item criteria box 412 in FIG. 4B) and the one or more environmental parameters associated with client device 104 or a user of client device 104 sampled by sampling module 226 (FIG. 2) in response to detecting the user input from the user of client device 104.

The client device receives (612), from server system 108, first information identifying one or more media files and synchronization information for synchronizing one or more audio tracks with the one or more media files. In some embodiments, receiving module 230 (FIG. 2) receives first information identifying one or more media files and synchronization information for synchronizing one or more audio tracks with the one or more media files from server system 108. The first information at least includes one or more pointers or URLs to one or more sources (e.g., media files database 114 and/or one or more media file sources 126) of the one or more media files. In some embodiments, the first information also includes the names of the one or more media files and metadata corresponding to the one or more media files. In some embodiments, the synchronization information includes one or more audio playback timestamps, where playback of the one or more audio tracks start from the one or more audio playback timestamps.

In some embodiments, client device also receives (614), from server system 108, second information identifying the one or more audio tracks. In some embodiments, when the information sent to server system 108 in step (608) did not include one or more audio tracks for the media item to generated, receiving module 230 (FIG. 2) also receives second information identifying one or more audio tracks. The second information at least includes one or more pointers or URLs to one or more sources (e.g., one and more audio sources 124) of the one or more audio tracks.

In some embodiments, client device also receives (616), from server system 108, effect information for combing the one or more media files with one or more transition effects. In some embodiments, the effect information instructs presenting module 236 to combine the one or more media files using methods more complex than simple cutting. In some embodiments, the effect information includes transition effects such as fades, dissolves, 3D transitions, wipes, and the like. In some embodiments, effect module 240 is configured to modulate the transition effects in real-time while presenting the media item in response to measured characteristics of the audio track or the one or more media files (e.g., speed, beat, tempo, frequency response, etc.).

The client device obtains (618) the one or more media files based on the first information. In some embodiments, determining module 232 (FIG. 2) determines a source for the one or more media files based on the first information received from server system 108. In some embodiments, after determining the source for the one or more media files (e.g., video library 256, image library 258, media files database 114, and/or one or more media file sources 126), client device 104 or a component thereof (e.g., obtaining module 234, FIG. 2) obtains the one or more media files from the identified source and buffers the one or more media files in video buffer 254 for display.

The client device obtains (620) one or more audio tracks. In some embodiments, client device 104 or a component thereof (e.g., obtaining module 234, FIG. 2) obtains the one or more audio tracks and buffers the one or more audio tracks in audio buffer 252 for playback.

In some embodiments, client device obtains (622) the one or more audio tracks based on the one or more audio tracks selected by the user input. In some embodiments, determining module 232 (FIG. 2) determines a source (e.g., audio library 260 and/or one or more audio sources 124) for the one or more audio tracks based on the audio track corresponding to audio track affordance 416-*c* selected in FIG. 4A and buffers the one or more audio tracks in audio buffer 252 for playback.

In some embodiments, client device obtains (624) the one or more audio tracks based on the second information. In some embodiments, determining module 232 (FIG. 2) determines a source (e.g., audio library 260 or one or more audio sources 124) for the one or more media files based on the second information received from server system 108 and buffers the one or more audio tracks in audio buffer 252 for playback.

The client device presents (626) the media item by displaying the one or more media files on the display and playing back the one or more audio tracks in synchronization with the one or more media files based on the synchronization information. For example, in FIG. 4D, client device 104 or a component thereof (e.g., presenting module 236, FIG. 2) displays on touch screen 406 the one or more media files associated with the media item generated by server system 108. In some embodiments, client device 104 or a component thereof (e.g., presenting module 236, FIG. 2) plays back, via one or more speakers 402, the one or more audio tracks associated with the media item generated by server system 108. In some embodiments, client device 104 or a component thereof (e.g., synchronizing module 238, FIG. 2) synchronizes playback of the one or more audio tracks with display of the one or more media items by starting playback of the one or more audio tracks from the audio playback timestamps identified in the synchronization information received from server system 108.

In some embodiments, client device 104 detects (628) a second user input indicating feedback as to the accuracy of the generated media item. FIG. 4E, for example, shows client device 104 detecting a user input (e.g., contact 456 at a location corresponding to feedback affordance 454) to provide feedback information for the media item generated by server system 108. For example, in response to detecting contact 456, client device 104 displays a feedback interface, and the user of client device 104 provides feedback information as to whether the media item generated by server system 108 matches the user's intentions for the media item.

In some embodiments, in response to detecting the second user input, client device 104 sends (630) the feedback to server system 108. In some embodiments, client device 104 or a component thereof (e.g., requesting module 228, FIG. 2) sends the feedback information provided by the user of client device 104 to server system 108. For example, in some embodiments, after receiving the feedback information, server system 108 or a component thereof (e.g., modifying module 322, FIG. 3) adjusts matching algorithm 324 based on the feedback information received from client device 104 for generating future media items.

Figure 7A:
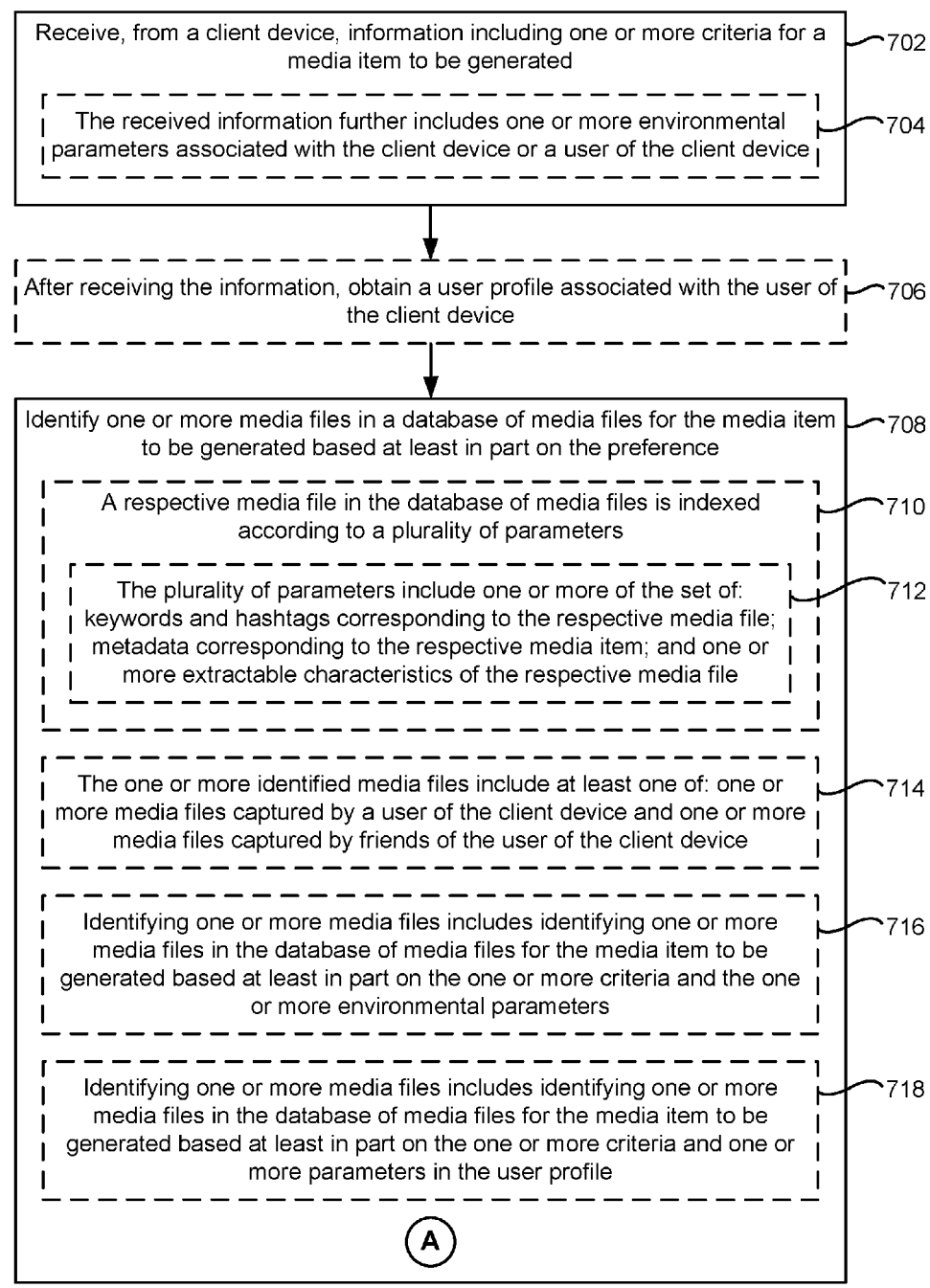
FIGS. 7A-7C illustrate a flowchart representation of a server-side method of generating a media item in accordance with some embodiments.
Figure 7B:
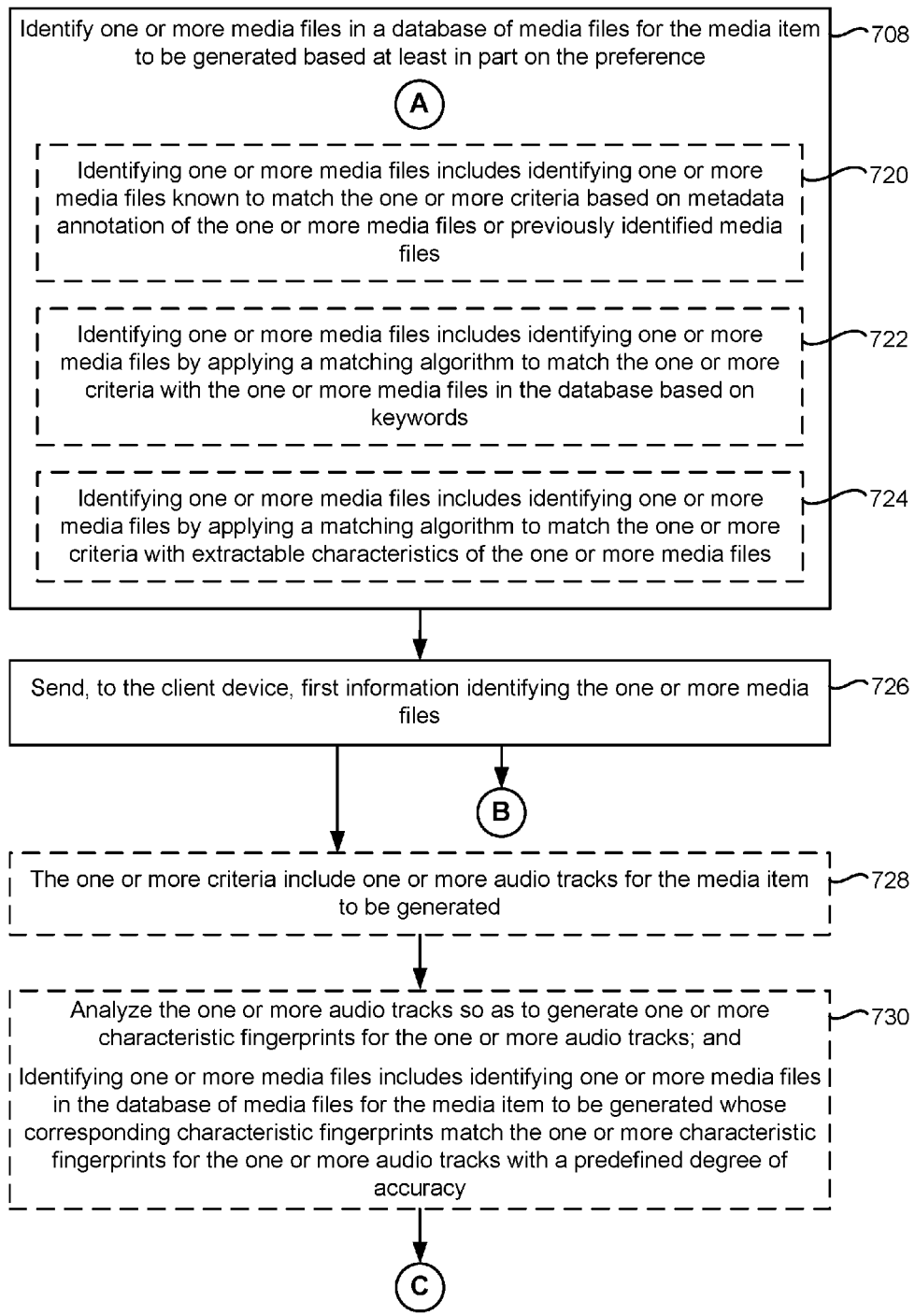
Figure 7C:
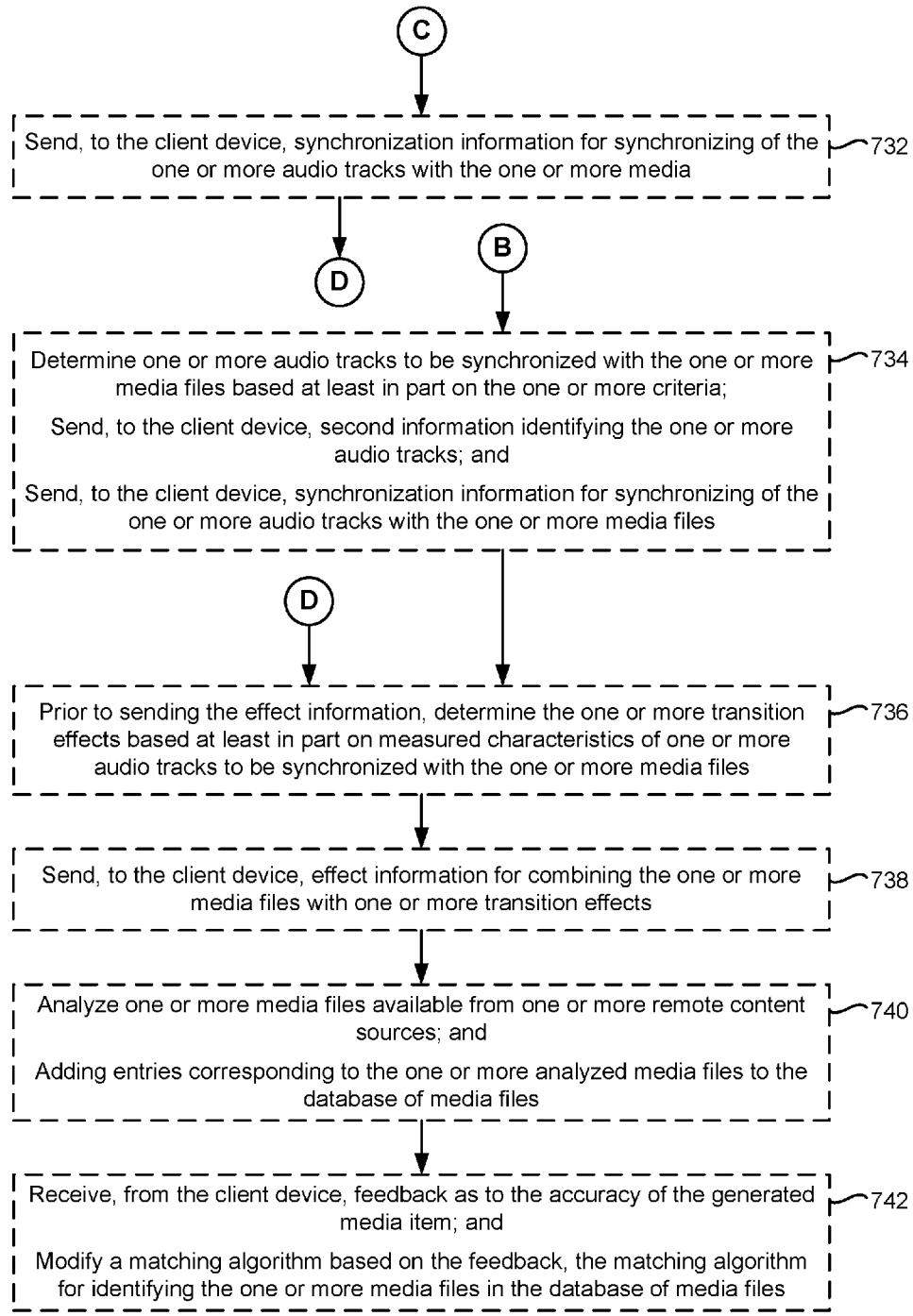

FIGS. 7A-7C illustrate a flowchart diagram of a method 700 of generating a media item in accordance with some embodiments. In some embodiments, method 700 is performed by a server with one or more processors and memory. For example, in some embodiments, method 700 is performed by server system 108 (FIGS. 1 and 3) or a component thereof (e.g., server-side module 106, FIGS. 1 and 3). In some embodiments, method 700 is governed by instructions that are stored in a non-transitory computer readable storage medium and the instructions are executed by the one or more processors of server system 108. Optional operations are indicated by dashed lines (e.g., boxes with dashed-line borders).

The server system receives (702), from a client device, information including one or more criteria for a media item to be generated. In some embodiments, receiving module 314 receives information from client device 104 including one or more criteria for the media item to be generated (e.g., the audio track corresponding to audio track affordance 416-c selected in FIG. 4A or the keywords in media item criteria box 412 in FIG. 4B). In some embodiments, the one or more criteria included in the information received from client device 104 include an indication of an audio track or a playlist of one or more audio tracks for the media item to be generated. In some embodiments, the one or more criteria included in the information received from client device 104 include one or more keywords or other information indicating the user's intentions/tastes for the media item to be generated such as an artist, an album, a music genre, or a mood.

In some embodiments, the received information further includes (704) one or more environmental parameters associated with the client device or a user of the client device. In some embodiments, the one or more environmental parameters include biometric information corresponding to a user of the client device (e.g., heartbeat, gait, galvanic skin response, blood pressure, emotion, and mood). In some embodiments, the one or more environmental parameters include geographic coordinates of client device 104, inertial information corresponding to the client device (e.g., velocity, acceleration, etc.), and/or time/date information.

In some embodiments, after receiving the information, the server system obtains (706) a user profile associated with the user of the client device. In some embodiments, server system 108 or a component thereof (e.g., obtaining module 316, FIG. 3) first determines whether a user profile corresponding to the user of client device 104 exists in one or more user profiles 346. If the user profile corresponding to the user of client device 104 exists in one or more user profiles 346, obtaining module 316 determines whether the user profile has been stored or updated in one or more user profiles 346 within a predetermined number of days. If the user profile in one or more user profiles 346 has been stored in one or more user profiles 346 within the predetermined number of days, obtaining module 316 obtains one or more parameters in the user profile that are relevant to identifying one or more media files for the media item to be generated. If the user profile does not exist in one or more user profiles 346 or the user profile in one or more user profiles 346 has not been stored or updated in one or more user profiles 346 within the predetermined number of days, obtaining module 316 obtains a user profile corresponding to the user from client device 104. In some embodiments, obtaining module 316 requests user profile 264 (FIG. 2) or one or more parameters therein from client device 104. In some embodiments, obtaining module 316 retrieves user profile 264 (FIG. 2) or one or more parameters therein from client device 104.

The server system identifies (708) one or more media files in a database of media files for the media item to be generated based at least in part on the one or more criteria. In some embodiments, server system 108 or a component thereof (e.g., identifying module 320, FIG. 3) is configured to identify one or more media files (e.g., video clips) for a media item to be generated according to matching algorithm 324. In some embodiments, matching algorithm 324 is configured to identify one or more media files in media item generation database 344 that match the information including one or more criteria, such as an audio track, keywords, genre, etc., received from client device 104 with a predefined degree of accuracy. In some embodiments, the identified one or more media items have a match likelihood that exceeds a predefined likelihood threshold (e.g., 95%, 90%, etc.). In some embodiments, the database of media files is a custom indexed database that is used by server system 108 for generating synchronized media items (e.g., media item generation database 344, FIG. 5).

In some embodiments, wherein a respective media file in the database of media files is indexed (710) according to a plurality of parameters. In FIG. 5, for example, each of a plurality of video clips (e.g., a first video clip corresponding to video clip identifier 512-1, a second video clip corresponding to video clip identifier 512-2, and an N-th video clip corresponding to video clip identifier 512-N) is associated with a corresponding entry in media item generation database 344 and is indexed according to a plurality of parameters in the corresponding entry.

In some embodiments, the plurality of parameters include (712) one or more of the set of: keywords and hashtags corresponding to the respective media file; metadata corresponding to the respective media item; and one or more extractable characteristics of the respective media file. In FIG. 5, for example, an entry in media item generation database 344 for a respective video clip corresponding to video clip identifier 512-1 is indexed according to video clip metadata 516, previously matched or associated audio tracks 518, keywords/hastags 522, and extractable characteristics 524.

In some embodiments, the one or more identified media files include (714) at least one of: one or more media files captured by a user of the client device and one or more media files captured by friends of the user of the client device. In some embodiments, server system 108 incorporates media content captured by the user of client device 104 or friends of the user of client device 104 (e.g., videos from video library 256, images from image library 258, or one or more media file sources 126) into the identified one or more media files for the media item to be generated. In this way, server system 108 personalizes the generated media item to the user of client device 104.

In some embodiments, identifying one or more media files includes (716) identifying one or more media files in the database of media files for the media item to be generated based at least in part on the one or more criteria and the one or more environmental parameters. In some embodiments, matching algorithm 324 is configured to identify one or more media files in media item generation database 344 based on the information (e.g., including one or more criteria such as an audio track, keywords, genre, etc.) received from client device 104 and one or more environmental parameters received from client device 104 (e.g., heart rate, pupillary response, geographic coordinates, acceleration, and so on) with a predefined degree of accuracy within a predefined degree of accuracy.

In some embodiments, identifying one or more media files includes (718) identifying one or more media files in the database of media files for the media item to be generated based at least in part on the one or more criteria and one or more parameters in the user profile. In some embodiments, matching algorithm 324 is configured to identify one or more media files in media item generation database 344 based on the information (e.g., including one or more criteria such as an audio track, keywords, genre, etc.) received from client device 104 and one or more parameters included in the obtained user profile (e.g., user likes/dislikes, media items previously viewed by the user, media item liked or favorited by the user, etc.) within a predefined degree of accuracy.

In some embodiments, identifying one or more media files includes (720) identifying one or more media files known to match the one or more criteria based on metadata annotation of the one or more media files or previously identified media files. In some embodiments, matching algorithm 324 is configured to identify one or more media files in media item generation database 344 that are known to match the one or more criteria in the information received from client device 104 with a predefined degree of accuracy. In some embodiments, the identified one or more media items have a match likelihood that exceeds a predefined likelihood threshold (e.g., 95%, 90%, etc.). For example, when the one or more received criteria include one or more audio tracks for the media item to be generated, matching algorithm 324 is configured to identify one or more media files that were previously matched to the audio track included in the one or more received criteria based on parameters 418 corresponding to media files in media item generation database 344.

In some embodiments, identifying one or more media files includes (722) identifying one or more media files by applying a matching algorithm to match the one or more criteria with the one or more media files in the database based on keywords. In some embodiments, matching algorithm 324 is configured to identify one or more media files in media item generation database 344 whose corresponding keywords or hashtags 522 and/or metadata 516 match the one or more criteria in the information received from client device 104 with a predefined degree of accuracy.

In some embodiments, identifying one or more media files includes (724) identifying one or more media files by applying a matching algorithm to match the one or more criteria with extractable characteristics of the one or more media files. In some embodiments, matching algorithm 324 is configured to identify one or more media files in media item generation database 344 whose extracted characteristics 524 match the one or more criteria in the information received from client device 104 with a predefined degree of accuracy.

The server system sends (726), to the client device, first information identifying the one or more media files. The first information at least includes one or more pointers or URLs 514 to one or more sources (e.g., media files database 114 and/or one or more media file sources 126) of the one or more media files. In some embodiments, the first information also includes the names of the one or more media files and metadata 516 corresponding to the one or more media files.

In some embodiments, the one or more criteria include (728) one or more audio tracks for the media item to be generated. In some embodiments, the one or more criteria included in the information received from client device 104 include an indication of an audio track or a playlist of one or more audio tracks for the media item to be generated. FIG. 4A, for example, shows client device 104 detecting selection of an audio track corresponding to audio track affordance 416-c for the media item to be generated. Continuing with this example, in response to detecting selection of the audio track for the media item to be generated, client device 104 sends information to server system 108 including an indication of the audio track corresponding to audio track affordance 416-c selected in FIG. 4A.

In some embodiments, the server system analyzes (730) the one or more audio tracks so as to generate one or more characteristic fingerprints for the one or more audio tracks, and identifying one or more media files includes identifying one or more media files in the database of media files for the media item to be generated whose corresponding characteristic fingerprints match the one or more characteristic fingerprints for the one or more audio tracks with a predefined degree of accuracy. In some embodiments, when the information received from client device 104 includes a respective audio track for the media item to be generated, analyzing module 318 is configured to generate a characteristic fingerprint for the respective audio track. Subsequently, matching algorithm 324 is configured to identify one or more media files in media item generation database 344 whose extracted characteristics 524 match the characteristic fingerprint for the audio track with a predefined degree of accuracy.

In some embodiments, the server system sends (732), to the client device, synchronization information for synchronizing of the one or more audio tracks with the one or more media files. In some embodiments, the synchronization information includes one or more audio playback timestamps, where playback of the one or more audio tracks selected by the user of client device 104 (e.g., the audio track corresponding to audio track affordance 416-c selected in FIG. 4A) start from the one or more audio playback timestamps.

In some embodiments, the server system determines (734) one or more audio tracks to be synchronized with the one or more media files based at least in part on the one or more criteria. In some embodiments, the user of client device 104 simply inputs a preference (e.g., one or more criteria) for a media item to be generated, which could be as broad as a single word or phrase (e.g., "sad and dark," "happy and seriously uplifting," "120 BPM," "steel drum," etc.). In response to receiving an indication of the preference, server system 108 creates a media item for the user by identifying one or more media files based on the indicated preference and determining an audio track based on the indicated preference. Subsequently, server system 108 causes the one or more identified video clips and the determined audio track to be streamed to client device 104. In some embodiments, the source of the one or more video clips is different from the source of the audio track.

In some embodiments, when the information received from client device 104 does not include one or more audio tracks for the media item to generated, determining module 326 is configured to determine one or more audio tracks for the media item to be generated after identifying module 320 identifies the one or more media files for the media item to be generated. In some embodiments, determining module 326 is configured to determine one or more audio tracks that were previously matched to the identified one or more media files as indicated in data component 418 of media item generation database 344. Alternatively, in some embodiments, determining module 326 is configured to determine one or more audio tracks whose characteristic fingerprints match the extracted characteristics 524 for the one or more identified media files with a predefined degree of accuracy.

In some embodiments, server system 108 also sends, to client device 104, second information identifying the one or more audio tracks and synchronization information for synchronizing of the one or more audio tracks with the one or more media files. The second information at least includes one or more pointers or URLs to one or more sources (e.g., one or more audio sources 124) of the one or more audio tracks. In some embodiments, the synchronization information includes one or more audio playback timestamps, where playback of the one or more audio tracks determined by server system 108 start from the one or more audio playback timestamps.

In some embodiments, prior to sending the effect information, the server system determines (736) the one or more transition effects based at least in part on measured characteristics of the one or more audio tracks to be synchronized with the one or more media files. In some embodiments, effects module 330 is configured to generate the transition effects based at least in part on characteristics extracted from the one or more audio tracks (e.g., indicated in the information received from client device 104 or determined by server system 108) and/or the one or more identified media files by analyzing module 318.

In some embodiments, the server system sends (738), to the client device, effect information for combining the one or more media files with one or more transition effects. In some embodiments, the effect information includes instructions for combining the one or more media files with transition effects such as fades, dissolves, 3D transitions, wipes, and the like.

In some embodiments, the server system (740): analyzes one or more media files available from one or more remote content sources; and adds entries corresponding to the one or more analyzed media files to the database of media files. In some embodiments, crawling module 332 is configured to access media files available from one or more media file sources 126, analyze the accessed media files, and add entries corresponding to the analyzed media files to media item generation database 344. As such, server system 108 incorporates media files from external video sources into media item generation database 344 for subsequent generation of media items.

In some embodiments, the server system (742): receives, from the client device, feedback as to the accuracy of the generated media item; and modifies a matching algorithm based on the feedback, the matching algorithm for identifying the one or more media files in the database of media files. For example, the user of client device 104 provides feedback information as to whether the media item generated by server system 108 matched the user's intentions for the media item. In some embodiments, server system 108 or a component thereof (e.g., modifying module 322, FIG. 3) adjusts matching algorithm 324 based on the received feedback information so as to improve the accuracy of matching algorithm 324 when generating subsequent media items.

It will be understood that, although the terms "first," "second," etc. may be used herein to describe various elements, these elements should not be limited by these terms. These terms are only used to distinguish one element from another. For example, a first media item could be termed a second media item, and, similarly, a second media item could be termed a first media item, without changing the meaning of the description, so long as all occurrences of the "first media item" are renamed consistently and all occurrences of the "second media item" are renamed consistently. The first media item and the second media item are both media items, but they are not the same media item.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method comprising:
   at a server system with one or more processors and memory:
   receiving from a user of a client device one or more audio files;
   obtaining one or more audio characteristics for the one or more audio files;
   receiving from the client device a request to generate a media item using the one or more audio files, the request including one or more criteria for the media item to be generated; and
   in response to receiving the request, automatically and without user interaction, generating the media item, including:
   identifying one or more visual media files based at least in part on the one or more criteria and the one or more audio characteristics; and
   generating synchronization information for synchronizing the one or more audio files with the one or more visual media files during playback of the media item;
   storing the media item in the server system, including storing information identifying: (1) the one or more audio files, (2) the identified one or more visual media files, and (3) the generated synchronization information; and
   enabling playback of the media item at the client device by sending a link for the stored media item to the client device.

2. The method of claim 1, further comprising identifying one or more sources for the identified one or more visual media files; and
   wherein storing the media item includes storing information identifying at least a subset of the one or more sources.

3. The method of claim 1, wherein the one or more criteria include identification information for the identified one or more visual media files.

4. The method of claim 1, wherein the identified one or more visual media files include at least one video, image, or audiovisual file.

5. The method of claim 1, wherein the one or more audio characteristics include one or more characteristic fingerprints for the one or more audio files; and
   wherein identifying the one or more visual media files includes matching, within a predefined degree of accuracy, at least one of the one or more characteristic fingerprints for the one or more audio files to one or more visual media characteristics for the identified one or more visual media files.

6. The method of claim 1, further comprising, after receiving the request, obtaining a user profile for the user of the client device; and
   wherein identifying the one or more visual media files includes identifying the one or more visual media files based at least in part on the user profile.

7. The method of claim 1, wherein the received request further includes one or more environmental parameters associated with the client device; and
   wherein identifying the one or more visual media files includes identifying the one or more visual media files based at least in part on the one or more environmental parameters.

8. The method of claim 1, wherein identifying the one or more visual media files includes identifying at least a subset of the one or more visual media files based on metadata of at least a subset of the one or more audio files.

9. The method of claim 1, wherein identifying the one or more visual media files includes applying a matching algorithm to match the one or more criteria with keywords for at least a subset of the identified one or more visual media files.

10. The method of claim 1, wherein identifying the one or more visual media files includes applying a matching algorithm to match the one or more criteria with extractable characteristics of at least a subset of the identified one or more visual media files.

11. The method of claim 1, further comprising storing the one or more visual media files in a database of media files at the server system, wherein a respective visual media file in the database of media files is indexed according to a plurality of parameters.

12. The method of claim 11, further comprising storing the one or more audio files in a database of media files at the server system, wherein the database of media files is indexed according to a plurality of parameters, including one or more of:
    keywords and hashtags corresponding to respective audio files;
    metadata corresponding to the respective audio files; or
    one or more extractable characteristics of the respective audio files.

13. The method of claim 1, wherein the one or more audio files include at least one of:
    one or more audio files captured by the user of the client device; or
    one or more audio files captured by friends of the user of the client device.

14. The method of claim 1, further comprising determining one or more audio or visual effects based at least in part on measured characteristics of the one or more audio files; and
    wherein storing the media item further includes storing effect information for adding the one or more audio or visual effects to the media item.

15. The method of claim 1, further comprising:
    receiving feedback from the user as to the accuracy of the generated media item; and
    modifying a matching algorithm for identifying the one or more audio visual media files based on the received feedback.

16. The method of claim 1, further comprising storing the one or more audio files at a first location at the server system; and
    wherein storing the media item includes storing information identifying the first location.

17. The method of claim 1, further comprising:
    receiving a playback request from a second client device to playback the media item, wherein the second client device is distinct from the client device; and
    in response to receiving the playback request, enabling playback of the media item at the second client device by sending the link to the stored media item to the second client device.

18. The method of claim 1, further including:
    receiving a modification request from a second user to modify the media item;

in response to receiving the modification request, storing a modified version of the media item in the server system;
storing an association between the modified version of the media item and media item in the server system; and
enabling playback of the modified version of the media item at a client device of the second user by sending a link for the modified version of the media item to the client device of the second user.

19. A server system, comprising:
one or more processors; and
memory storing one or more programs to be executed by the one or more processors, the one or more programs comprising instructions for:
  receiving from a user of a client device one or more audio files;
  obtaining one or more audio characteristics for the one or more audio files;
  receiving from the client device a request to generate a media item using the one or more audio files, the request including one or more criteria for the media item to be generated; and
  in response to receiving the request, automatically and without user interaction, generating the media item, including:
    identifying one or more visual media files based at least in part on the one or more criteria and the one or more audio characteristics; and
    generating synchronization information for synchronizing the one or more audio files with the one or more visual media files during playback of the media item;
  storing the media item in the server system, including storing information identifying: (1) the one or more audio files, (2) the identified one or more visual media files, and (3) the generated synchronization information; and
  enabling playback of the media item at the client device by sending a link for the stored media item to the client device.

20. A non-transitory computer-readable storage medium storing one or more programs, the one or more programs comprising instructions, which, when executed by a server system with one or more processors, cause the server system to:
  receive from a user of a client device one or more audio files;
  obtain one or more audio characteristics for the one or more audio files;
  receive from the client device a request to generate a media item using the one or more audio files, the request including one or more criteria for the media item to be generated; and
  in response to receiving the request, automatically and without user interaction, generate the media item, including:
    identifying one or more visual media files based at least in part on the one or more criteria and the one or more audio characteristics; and
    generating synchronization information for synchronizing the one or more audio files with the one or more visual media files during playback of the media item;
  store the media item in the server system, including storing information identifying: (1) the one or more audio files, (2) the identified one or more visual media files, and (3) the generated synchronization information; and
  enable playback of the media item at the client device by sending a link for the stored media item to the client device.

* * * * *